(12) United States Patent
Castrogiovanni et al.

(10) Patent No.: US 7,489,947 B2
(45) Date of Patent: *Feb. 10, 2009

(54) METHOD, APPARATUS AND ARTICLE TO REMOTELY ASSOCIATE WIRELESS COMMUNICATIONS DEVICES WITH SUBSCRIBER IDENTITIES AND/OR PROXY WIRELESS COMMUNICATIONS DEVICES

(75) Inventors: Benedetto Castrogiovanni, Seattle, WA (US); John S. Read, Federal Way, WA (US)

(73) Assignee: Casabyte, Inc., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/690,081

(22) Filed: Mar. 22, 2007

(65) Prior Publication Data
US 2007/0177562 A1    Aug. 2, 2007

Related U.S. Application Data

(63) Continuation of application No. 10/964,205, filed on Oct. 12, 2004, now Pat. No. 7,274,950, which is a continuation of application No. 10/194,417, filed on Jul. 11, 2002, now Pat. No. 6,836,670.

(60) Provisional application No. 60/379,603, filed on May 9, 2002.

(51) Int. Cl.
*H04B 1/38* (2006.01)
(52) U.S. Cl. ............ 455/558; 455/410; 455/411; 455/414.1; 455/418; 455/422.1; 455/423; 455/424; 455/466; 455/556.1; 380/249; 379/21

(58) Field of Classification Search ............... 455/410, 455/411, 414.1, 418, 422.1, 423, 466, 558, 455/556.1; 379/21; 380/249
See application file for complete search history.

(56) References Cited

U.S. PATENT DOCUMENTS

| 4,977,399 A | 12/1990 | Price et al. ............. 340/825.44 |
| 5,357,557 A | 10/1994 | Sakakura ..................... 379/27 |
| 5,451,839 A | 9/1995 | Rappaport et al. .......... 375/224 |
| 5,481,588 A | 1/1996 | Rickli et al. .................. 379/32 |

(Continued)

FOREIGN PATENT DOCUMENTS

WO    WO93/15569    8/1993

(Continued)

OTHER PUBLICATIONS

"What is a Type-56 Responder/Type-105 Test Line?" Sage Instruments, Freedom, CA, 1991.

(Continued)

*Primary Examiner*—Stephen M D'Agosta
(74) *Attorney, Agent, or Firm*—Seed IP Law Group PLLC

(57) ABSTRACT

Apparatus and methods provide remote access to subscriber identity information and subscriber configuration information stored on one or more subscriber identity modules (SIMs), to allow remote configuration of wireless communications devices. A SIM server provides access to the SIMs, a SIM librarian catalogs the SIMs, and a SIM accounting system tracks and/or bills for SIM usage. Apparatus and methods provide remote access to proxy wireless communications devices, allowing such devices to operate as if actually present in the remote locations.

10 Claims, 23 Drawing Sheets

U.S. PATENT DOCUMENTS

| | | | | |
|---|---|---|---|---|
| 5,490,204 | A | 2/1996 | Gulledge | 379/59 |
| 5,557,679 | A | 9/1996 | Julin et al. | 380/249 |
| 5,615,225 | A | 3/1997 | Foster et al. | 379/29 |
| 5,673,259 | A * | 9/1997 | Quick, Jr. | 370/342 |
| 5,706,333 | A | 1/1998 | Grenning et al. | 379/59 |
| 5,768,689 | A | 6/1998 | Borg | 455/67.4 |
| 5,835,564 | A | 11/1998 | Chang et al. | 379/1 |
| 5,875,398 | A | 2/1999 | Snapp | 455/424 |
| 5,903,633 | A | 5/1999 | Lorsch | 379/114.2 |
| 5,923,705 | A | 7/1999 | Willkie et al. | 375/220 |
| 5,930,707 | A | 7/1999 | Vambaris et al. | 455/424 |
| 5,931,907 | A | 8/1999 | Davies et al. | 709/218 |
| 5,933,776 | A | 8/1999 | Kirkpatrick | 455/423 |
| 5,987,306 | A | 11/1999 | Nilsen et al. | 455/67.1 |
| 6,055,425 | A | 4/2000 | Sinivaara | 455/431 |
| 6,118,982 | A | 9/2000 | Ghisler et al. | 455/67.4 |
| 6,169,883 | B1 | 1/2001 | Vimpari et al. | 455/67.1 |
| 6,175,747 | B1 * | 1/2001 | Tanishima et al. | 455/562.1 |
| 6,195,705 | B1 | 2/2001 | Leung | 709/245 |
| 6,201,802 | B1 | 3/2001 | Dean | 370/350 |
| 6,230,002 | B1 | 5/2001 | Floden et al. | 455/411 |
| 6,230,006 | B1 | 5/2001 | Keenan et al. | 455/424 |
| 6,233,448 | B1 | 5/2001 | Alperovich et al. | 455/417 |
| 6,234,810 | B1 | 5/2001 | Schnell et al. | 439/76.1 |
| 6,234,844 | B1 | 5/2001 | Somerville et al. | 439/630 |
| 6,236,853 | B1 | 5/2001 | Mee et al. | 455/414 |
| 6,240,301 | B1 | 5/2001 | Phillips | 455/550 |
| 6,244,553 | B1 | 6/2001 | Wang | 248/278.1 |
| 6,244,911 | B1 | 6/2001 | Heim | 439/862 |
| 6,249,276 | B1 | 6/2001 | Ohno | 345/173 |
| 6,253,073 | B1 | 6/2001 | Cooper | 455/411 |
| 6,259,921 | B1 | 7/2001 | Totaro et al. | 455/445 |
| 6,259,929 | B1 | 7/2001 | Kuisma | 455/550 |
| 6,261,128 | B1 | 7/2001 | Heim et al. | 439/630 |
| 6,264,506 | B1 | 7/2001 | Yasufuku et al. | 439/638 |
| 6,266,527 | B1 | 7/2001 | Mintz | 455/423 |
| 6,272,450 | B1 | 8/2001 | Hill et al. | 703/13 |
| 6,278,706 | B1 | 8/2001 | Gibbs et al. | 370/352 |
| 6,278,886 | B1 | 8/2001 | Hwang | 455/566 |
| 6,282,182 | B1 | 8/2001 | Pecen et al. | 370/336 |
| 6,282,491 | B1 | 8/2001 | Bochmann et al. | 701/209 |
| 6,283,376 | B1 | 9/2001 | Schuder et al. | 235/486 |
| 6,285,869 | B1 | 9/2001 | Shannon et al. | 455/411 |
| 6,292,666 | B1 | 9/2001 | Siddiqui et al. | 455/456 |
| 6,292,668 | B1 | 9/2001 | Alanara et al. | 455/466 |
| 6,295,454 | B1 | 9/2001 | Havinis et al. | 455/456 |
| 6,298,247 | B1 | 10/2001 | Alperovich et al. | 455/558 |
| 6,301,475 | B1 | 10/2001 | Saarela et al. | 455/426 |
| 6,305,960 | B1 | 10/2001 | Fan | 439/188 |
| 6,307,934 | B1 | 10/2001 | Möster et al. | 379/438 |
| 6,308,069 | B1 | 10/2001 | Freitag et al. | 455/435 |
| 6,308,070 | B1 | 10/2001 | Laster | 455/445 |
| 6,308,317 | B1 | 10/2001 | Wilkinson et al. | 717/5 |
| 6,311,054 | B1 | 10/2001 | Korpela | 455/406 |
| 6,311,055 | B1 | 10/2001 | Boltz | 455/414 |
| 6,314,290 | B1 | 11/2001 | Joshi et al. | 455/427 |
| 6,320,751 | B2 | 11/2001 | Takeda et al. | 361/737 |
| 6,320,873 | B1 | 11/2001 | Nevo et al. | 370/466 |
| 6,321,079 | B1 | 11/2001 | Cooper | 455/411 |
| 6,321,084 | B1 | 11/2001 | Horrer | 455/431 |
| 6,324,402 | B1 | 11/2001 | Waugh et al. | 455/445 |
| 6,324,412 | B1 | 11/2001 | Alen et al. | 455/567 |
| 6,326,543 | B1 | 12/2001 | Lamp et al. | 174/52.1 |
| 6,327,153 | B2 | 12/2001 | Rauhala et al. | 361/737 |
| 6,332,579 | B1 | 12/2001 | Ritter | 235/492 |
| 6,334,052 | B1 | 12/2001 | Nordstrand | 455/411 |
| 6,341,069 | B1 | 1/2002 | Torlotin | 361/737 |
| 6,341,220 | B1 | 1/2002 | Hurme | 455/410 |
| 6,341,228 | B1 | 1/2002 | Hubbe et al. | 455/566 |
| 6,343,945 | B1 | 2/2002 | Liikanen | 439/160 |
| 6,349,204 | B1 | 2/2002 | Goetz et al. | 455/419 |
| 6,353,737 | B1 | 3/2002 | Herzog | 455/418 |
| 6,375,073 | B1 | 4/2002 | Aebi et al. | 235/379 |
| 6,384,789 | B2 | 5/2002 | Hofmann | 343/702 |
| 6,385,300 | B1 | 5/2002 | Mohammadian et al. | 379/21 |
| 6,393,408 | B1 | 5/2002 | Mosher et al. | 705/28 |
| 6,430,410 | B1 * | 8/2002 | Staber | 455/423 |
| 6,453,161 | B1 | 9/2002 | Touati et al. | 455/433 |
| 6,456,859 | B1 | 9/2002 | Desblancs et al. | 455/558 |
| 6,466,804 | B1 | 10/2002 | Pecen et al. | 455/558 |
| 6,542,738 | B2 | 4/2003 | Keenan et al. | 455/424 |
| 6,549,773 | B1 | 4/2003 | Linden et al. | 455/426 |
| 6,584,326 | B1 | 6/2003 | Boydston et al. | 455/558 |
| 6,591,084 | B1 | 7/2003 | Chuprun et al. | 455/3.05 |
| 6,641,037 | B2 | 11/2003 | Williams | 235/383 |
| 6,650,891 | B1 | 11/2003 | Wierzbitzki et al. | 455/414.3 |
| 6,711,262 | B1 * | 3/2004 | Vatanen | 380/277 |
| 6,745,048 | B2 | 6/2004 | Vargas et al. | 455/558 |
| 6,788,934 | B2 | 9/2004 | Keenan et al. | 455/424 |
| 6,795,703 | B2 | 9/2004 | Takae et al. | 455/418 |
| 6,922,721 | B1 | 7/2005 | Minborg et al. | 709/219 |
| 6,925,568 | B1 | 8/2005 | Heinonen | 713/193 |
| 6,957,334 | B1 * | 10/2005 | Goldstein et al. | 713/170 |
| 6,996,072 | B1 | 2/2006 | Minborg | 370/260 |
| 2002/0028659 | A1 | 3/2002 | Adams et al. | 455/67.1 |
| 2002/0052841 | A1 * | 5/2002 | Guthrie et al. | 705/40 |
| 2002/0137545 | A1 | 9/2002 | Nachef | 455/558 |
| 2002/0188736 | A1 | 12/2002 | Jarvensivu | 709/229 |
| 2003/0110085 | A1 | 6/2003 | Murren et al. | 705/26 |
| 2003/0139180 | A1 | 7/2003 | McIntosh et al. | 455/426 |
| 2003/0163384 | A1 | 8/2003 | Hendra | 705/26 |
| 2003/0211840 | A1 | 11/2003 | Castrogiovanni et al. | 455/405 |
| 2003/0211841 | A1 | 11/2003 | Castrogiovanni et al. | 455/411 |
| 2003/0211861 | A1 | 11/2003 | Castrogiovanni et al. | 455/551 |
| 2003/0212616 | A1 | 11/2003 | Castrogiovanni et al. | 705/30 |
| 2003/0220101 | A1 | 11/2003 | Castrogiovanni et al. | 455/419 |
| 2004/0204089 | A1 | 10/2004 | Castrogiovanni et al. | 455/558 |
| 2004/0204117 | A1 | 10/2004 | Weiner | 455/564 |
| 2005/0026589 | A1 | 2/2005 | Holland et al. | 455/404.1 |
| 2005/0105512 | A1 | 5/2005 | Myrhe et al. | 370/352 |
| 2005/0246282 | A1 | 11/2005 | Naslund et al. | 705/52 |

FOREIGN PATENT DOCUMENTS

| | | |
|---|---|---|
| WO | WO98/58509 | 12/1998 |
| WO | WO99/25140 | 5/1999 |
| WO | WO99/27721 | 6/1999 |

OTHER PUBLICATIONS

"356EC Cellular Responder," Sage Instruments, freedom, CA, 1991.
"356 TMK Cellular Responder," Sage Instruments, Freedom, CA, 1991.
"Specifications: 930A Communications Test Set," Sage Instruments, Freedom, CA, Feb. 1990.
"CellSTAR Automated Transmission Test System," Sage Instruments, Freedom, CA, Feb. 1991.
"CellSTAR," Sage Instruments, Freedom, CA, Feb. 1992.
"CellSTAR System Worksheet," Sage Instruments, Freedom, CA, Feb. 1992.
"Revenue Assurance Products," *Network Performance Improvement Products*, Comarco Wireless Technologies, http://www.comarco.com/html/revenue_assurance_series.htm, accessed Aug. 10, 1998.
"Automated Remote Origination Network Test System," IC Engineering, Inc., Owings Mills, MD, Nov. 1991.
"Model RTS-1 Remote Access/Loopback Terminal Set Instructions," Metro Tel, Practise 56-0018, Issue 2, Sep. 1991.
Huffman, M., "Cut Travel Time for Translations," *Telephone Employees & Management*, pp. 72-73, Mar. 1, 1992.
"TMS Product Catalog," Metro Tel, Hicksville, NY, Sep. 1991.
U.S. Appl. No. 10/194,430, filed Jul. 11, 2002.
U.S. Appl. No. 10/194,440, filed Jul. 11, 2002.
U.S. Appl. No. 10/194,450, filed Jul. 11, 2002.

U.S. Appl. No. 10/194,937, filed Jul. 11, 2002.
U.S. Appl. No. 10/194,938, filed Jul. 11, 2002.
U.S. Appl. No. 11/290,910, filed Jul. 11, 2005.

U.S. Appl. No. 11/355,055, filed Feb. 16, 2006.

* cited by examiner

METHOD, APPARATUS AND ARTICLE TO REMOTELY ASSOCIATE WIRELESS COMMUNICATIONS DEVICES WITH SUBSCRIBER IDENTITIES AND/OR PROXY WIRELESS COMMUNICATIONS DEVICES

BACKGROUND OF THE INVENTION

1. Field of the Invention

This invention generally relates to wireless communications, for example, cellular communications.

2. Description of the Related Art

The use of wireless communications is rapidly growing. Wireless communications devices such as cellular phones and wireless personal digital assistants ("PDA") are ubiquitous in today's culture. These devices transmit and/or receive audio and/or data wirelessly. For example, cellular phones may transmit and receive audio, text messaging, and may even allow access to the Internet. PDAs typically transmit and/or receive electronic mail ("e-mail") and may provide access to the Worldwide Web ("WWW"). These wireless communications devices are typically handheld battery powered devices which a user operates using keyed entries, stylus strokes, and/or voice activation by way of a user interface ("UI"). Many wireless communications devices also include a display for displaying information and/or a command menu which forms part of the UI. Wireless communications devices also typically include an antenna, a transceiver or a transmitter and receiver, and a processor such as a microprocessor, application specific integrated circuit ("ASIC") and/or digital signal processor ("DSP") for controlling operation.

The wireless communications devices rely on wireless communications service providers for providing subscribed services. The wireless communications service providers operate wireless communications service provider systems that provide for registration, authentication, location updating, handovers, and call routing. The wireless communications service provider systems typically employ a Home Location Register ("HLR") and a Visitor Location Register ("VLR") to provide call routing and roaming. The HLR contains all of the administrative information for each subscriber registered with the wireless communications service provider, along with current location information for a wireless communications device currently associated with the subscriber. The VLR contains selected administrative information from the HLR which is required for call control and for providing subscribed services for each wireless communications device currently within a geographical area service by the VLR.

Many wireless communications devices include computer-readable media commonly referred to as a subscriber identity module ("SIM") that contains subscriber related data or information. While the SIM typically takes the form of a physically removable device such as a "smartcard" or similar article, in certain embodiments the SIM may be permanently fixed in the wireless communications device. The SIM typically includes a microchip having a microprocessor and persistent memory such as erasable programmable read-only memory ("EPROM"). In addition to other information, the SIM may store one or more identifiers that uniquely identify a subscriber. Thus, a wireless communications device may be associated or configured with a subscribers specific identity and related information by physically placing the appropriate SIM into a SIM slot of the wireless communication device.

While other wireless protocols exist (i.e., TDMA, CDMA), one of the most popular of the numerous wireless protocols is the European Global System for Mobile Communications ("GSM") standard. Under GSM, the SIM stores an identifier commonly known as an International Mobile Subscriber Identity ("IMSI"). The IMSI is hardcoded in the SIM and is protected against change or tampering. The HLR logically relates the IMSI to the telephone number (i.e., Mobile Subscriber ISDN) associated with the subscriber, as well as relating the IMSI to the services subscribed to by the subscriber. Also under GSM, the SIM stores a second identifier in the form of a secret key for subscriber authentication and/or communications encryption, as discussed below. The SIM may be protected against unauthorized use by way of a password and/or personal identity number.

Under GSM, a separate identifier, commonly known as an International Mobile Equipment Identity ("IMEI"), is hardwired or hardcoded into the wireless communications device, and is used to uniquely identify the wireless communications device. The IMSI and IMEI are independent, providing personal mobility by allowing a subscriber to use a SIM in a variety of different wireless communications devices at different times.

In use, the wireless communications service provider authenticates the subscriber at a start of each call, and also authenticates the subscriber at intervals during the call. The wireless communications service provider system typically relies on the Signaling System Number 7 ("SS7") for signaling between the various functional entities, such as challenging the wireless communications device with a request for authorization. As discussed above, each subscriber is assigned an IMSI and a secret key. One copy of the secret key resides on the SIM and another copy of the secret key resides with the wireless communications service provider in an Authentication Center ("AuC"). During authentication, the AuC challenges the wireless communications device by generating and transmitting a random number to the wireless communications device as part of an authentication request. The AuC and the wireless communications device each generate a respective response, commonly referred to as a "signed response" ("SRES") based on the secret key and random number using a ciphering algorithm, commonly referred to as "A3". The wireless communications device transmits the SRES back to the AuC, which authenticates the subscriber if the SRES generated by the wireless communications device matches the SRES generated by the AuC. The wireless communications device and AuC may also generate a ciphering key for encrypting communications based on the random number and secret key using a second ciphering algorithm, commonly referred to as "A8".

The wireless communications service provider also verifies a status of the wireless communications device, for example, at a start of each call. The wireless communications service provider maintains an Equipment Identity Register (EIR) which stores a list of all IMEIs on the service provider's network and a status for each corresponding wireless communications device. Typically, the EIR will employ three levels of status, a "white-list" status indicating that the wireless communications device is approved to be connected, a "gray-list" status indicating that the wireless communications device may be connected but that problems may exist, and a "black-list" status indicating that the wireless communications device may not be connected due to a problem, for example, where the device has been reported stolen or is not of an approved type for use with the wireless communications service provider system.

The SIM may also store additional subscriber related information such as subscriber configuration or customization information, for custom configuring the wireless communications device to the subscriber's specific requirements or preferences. For example, the subscriber configuration information may identify a home service area, a list of frequently called numbers, voice recognition samples, a list of most recent calls received and/or placed by the subscriber, a notification setting (e.g., ring or vibrate), a list of short messages, etc.

Thus, wireless communication devices typically utilizes subscriber identification information such as an IMSI and/or secret key, as well as subscriber configuration information. The subscriber identification information is hardwired into a chip or card in order to prevent tampering, while the subscriber configuration information is typically soft coded to allow updating. While the SIM may be replaceable in some wireless communications devices, replacement typically requires the wireless communications device and the replacement SIM to be in the same physical location.

Wireless communications systems and devices may require testing to assure performance. One method of testing is to physically transit portions of the area covered by the wireless communications system while operating a wireless communications device. Another approach suggested in U.S. Pat. Nos. 5,875,398 and 6,230,006 and employs remotely operated test platforms which are pre-positioned at a variety of locations in the wireless communications coverage area. The remote test platforms typically include two or more wireless communications devices which may be controlled by a local or central controller to place and receive calls in selected coverage areas.

BRIEF SUMMARY OF THE INVENTION

Remote testing may be limited by the subscriber identification information and/or subscriber configuration information stored in the wireless communications devices at the remote test platforms. Updating this information would typically require a visit by a technician. The requirement that a SIM be physically received in a SIM slot of a wireless communications device also requires the ownership of more SIMs than would be typically be desired during actual testing.

In one aspect, a system to dynamically associate wireless communications devices with subscriber identities includes a subscriber identity module bank having a number of positions for respectively receiving subscriber identity modules and a subscriber identity module server having a communications port to receive requests and configured to dynamically provide subscriber identity information from subscriber identity modules received in the respective positions, if any, to a remote wireless communications client located remotely from the subscriber identity module bank in response to the received requests.

In another aspect, a subscriber identity module server to remotely associate a client wireless communications device with subscriber identity information includes a processor, a communications port to receive requests for subscriber identity modules, the communications port coupled to the processor, and at least one computer-readable media storing instructions that cause the processor to cause subscriber identity information from the requested subscriber identity module to be provided to the client wireless communications device in response to the request, where the client wireless communications device is remote from the subscriber identity module server.

In another aspect, a subscriber identity module server to remotely associate a remote client wireless communications device with subscriber identity information includes a processor, a communications port to receive requests for a subscriber identity module, the communications port coupled to the processor, and at least one computer-readable media storing instructions that cause the processor to determine whether the subscriber identity module server has access to the requested subscriber identity module and to cause a set of subscriber identity information from the requested subscriber identity module to be provided to the client wireless communications device if has subscriber identity module server has access to the requested subscriber identity module.

In another aspect, a subscriber identity module librarian to track subscriber identity modules for use in remotely associating wireless communications devices with subscriber identity information includes a processor, a communications port to receive requests for subscriber identity module address information, the communications port coupled to the processor, and at least one computer-readable media storing a set of address information for each of a number of subscriber identity modules in a respective position of each at least one subscriber identity module banks remotely located from the subscriber identity module librarian, the computer-readable media storing computer-readable instructions that cause the processor to provide subscriber identity module address information in response to a request received at the communications port.

In yet another aspect, accounting system to track usage of a plurality of subscriber identity modules includes a processor, at least one communications port coupled to each of a number of subscriber identity module servers to receive subscriber module request information, and at least one computer-readable media having instructions that cause the processor to track usage of the subscriber identity modules by: monitoring usage of the subscriber identity modules by at least one of a number of tracking entities.

In yet another aspect, a system to remotely operate wireless telecommunications devices includes a first subscriber identity module bank having a number of positions for receiving a number of subscriber identity modules and a first subscriber identity module server associated with the first subscriber identity module bank and responsive to requests to provide subscriber identity information from the subscriber identity modules, if any, received at the positions of the associated subscriber identity module bank.

In yet another aspect, system to remotely operate wireless telecommunications devices includes a first subscriber identity module bank having a number of positions for receiving a number of subscriber identity modules, a first subscriber identity module server associated with the first subscriber identity module bank and responsive to requests to provide subscriber identity information from the subscriber identity modules, if any, received at the positions of the associated subscriber identity module bank, and a subscriber identity module librarian having a data structure that defines a set of relationships between a number of subscriber identity modules identifiers corresponding to respective subscriber identity modules, if any, and a network location of the respective subscriber identity module in a network.

In even another aspect, a system to remotely operate wireless telecommunications devices includes a first subscriber identity module bank having a number of positions for receiving a number of subscriber identity modules, a first subscriber identity module server associated with the first subscriber identity module bank and responsive to requests to provide subscriber identity information from the subscriber identity modules, if any, received at the positions of the associated subscriber identity module bank, and a controller having a processor programmed to remotely control operation of a number of remote wireless communications clients at respective remote locations with respect to the controller, by transmitting commands over a communications channel to the remote wireless communications clients where at least one of the commands includes a subscriber identity module identifier.

In even another aspect, a system to remotely operate wireless telecommunications devices includes a first subscriber identity module bank having a number of positions for receiving a number of subscriber identity modules, a first subscriber identity module server associated with the first subscriber identity module bank and responsive to requests to provide subscriber identity information from the subscriber identity modules, if any, received at the positions of the associated first subscriber identity module bank, a second subscriber identity module bank having a number of positions for receiving a number of subscriber identity modules, and a second subscriber identity module server associated with the second subscriber identity module bank and responsive to requests to provide subscriber identity information from the subscriber identity modules, if any, received at the positions of the associated second subscriber identity module bank, wherein each of the first and the second subscriber identity servers include a respective computer-readable media storing computer accessible address information for subscriber identity modules received in each of the first and the second subscriber identity module banks.

In yet even another aspect, a method of remotely associating a wireless communications device with subscriber identities includes receiving a first request, determining a first subscriber identity module capable of providing a first set of subscriber identity information corresponding to the first request, and automatically providing the first set of subscriber identity information from the first subscriber identity module to the wireless communications device over a communications path where the wireless communications device is remote from the first subscriber identity module.

In a further aspect, a method to remotely associate a remote client wireless communications device with subscriber identity information includes receiving a request for a subscriber identity module at a first subscriber identity module server, determining whether the first subscriber identity module server has access to the requested subscriber identity module, and causing a set of subscriber identity information from the requested subscriber identity module to be provided to the client wireless communications device if the subscriber identity module server has access to the requested subscriber identity module.

In a further aspect, a method of remotely associating wireless communications client with subscriber identities includes receiving a first request from a wireless communications client, determining whether the received first request includes a sufficient indication of authorization, and automatically providing a first set of subscriber identity information from a first subscriber identity module corresponding to the first request to the requesting wireless communications client over a communications path if the received first request includes a sufficient indication of authorization where the wireless communications device is remote from the first subscriber identity module, and denying access to the first set of subscriber identity information from the first subscriber identity module to the requesting wireless communications client if the received first request does not include a sufficient indication of authorization.

In a further aspect, a method to remotely associate a remote wireless communications client with subscriber identity information includes receiving a set of subscriber identity information from the remotely located subscriber identity module in response to a requests for a subscriber identity module and operating the wireless communications device using the received subscriber identity information.

In yet a further aspect, a method of tracking subscriber identity modules for use in remotely associating wireless communications devices with subscriber identities includes storing a respective set of address information for each of a number of subscriber identity modules, receiving a request for subscriber identity module address information, and providing the set of subscriber identity module address information in response to the received request.

In yet a further aspect, a method of tracking subscriber identity modules for use in remotely associating wireless communications devices with subscriber identities includes receiving a subscriber identity module request, determining if the requested subscriber identity module is available in at least one of a number of associated subscriber identity module banks, and requesting address information for the requested subscriber identity module from a remote subscriber identity module librarian if the requested subscriber identity module is not available in at least one of the number of associated subscriber identity module banks.

In still a further aspect, a method of accounting in a wireless communications system includes receiving subscriber identity module usage information from each of a number of subscriber identity module servers and for each of a number of tracking entities, monitoring the usage of each of a number of subscriber identity modules based on the received subscriber identity module usage information.

In still a further aspect, a method to remotely operate wireless telecommunications devices includes receiving a request for at least one of a number of subscriber identity modules and responding to the request by providing subscriber identity information from the requested one of the subscriber identity modules to an at least first wireless telecommunications device of a first remote wireless communications client.

In yet still a further aspect, a method to remotely operate wireless telecommunications devices includes transmitting commands over a communications channel to a remote wireless communications client having at least one wireless communications device where at least one of the commands includes a subscriber identity module identifier corresponding to a subscriber identity module providing subscriber identity information for use in operating the wireless communications device and receiving results from the remote wireless communications client in response to execution of the commands.

In an additional aspect, a method of allocating access to subscriber identity information includes providing remote access by a tracking entity to a plurality of subscriber identity modules over a communications channel, each of the subscriber identity modules capable of providing a respective set of subscriber identity information and automatically tracking usage of the subscriber identity modules by the tracking entity.

In yet an additional aspect, a method of operating a subscriber identity module server includes receiving a request at a first subscriber identity module server for a first subscriber identity module, providing subscriber identity information from the first subscriber identity module to a remote client communications device if the requested first subscriber identity module is accessible by the first subscriber identity module server and providing a computer routable address to the remote client communications device if the requested first subscriber identity module not accessible by the first subscriber identity module server and is accessible by a second subscriber identity module server for which the first subscriber identity module server stores address information.

In yet a further additional aspect, a method of remotely associating a wireless communications device with subscriber identities includes receiving a first request for a subscriber identity, determining a first subscriber identity module corresponding to the subscriber identity of the first request, and exclusively allocating the determined first subscriber identity module to a wireless communications device.

In even a further aspect, a remote access system to remotely access wireless communications devices includes a wireless communications device rack having a number of positions for respectively receiving proxy wireless communications devices, and a wireless device server having a communications port to receive a request for remote access to a proxy wireless communications device and configured to provide a communications link with at least one of the proxy wireless communications devices received in the respective positions of the wireless communications rack, if any, to a controlling wireless communications device located remotely from the wireless communications rack in response to the received request for remote access to a proxy wireless communications device.

In still even a further aspect, a method of providing remote access to proxy wireless communications devices by controlling wireless communications devices includes receiving a first request for remote access to a proxy wireless communications device, determining a first proxy wireless communications device corresponding to the first request for remote access to the proxy wireless communications device, and automatically linking the first proxy wireless communications device to a first controlling wireless communications device over a communications path where the first controlling wireless communications device is remote from the first proxy wireless communications device in response to the first request for remote access to a proxy wireless communications device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with computers, servers, networks, wireless communications devices and systems have not been shown or described in detail to avoid unnecessarily obscuring descriptions of the embodiments of the invention.

Unless the context requires otherwise, throughout this specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Wireless Communications Environment Overview

Figure 1:
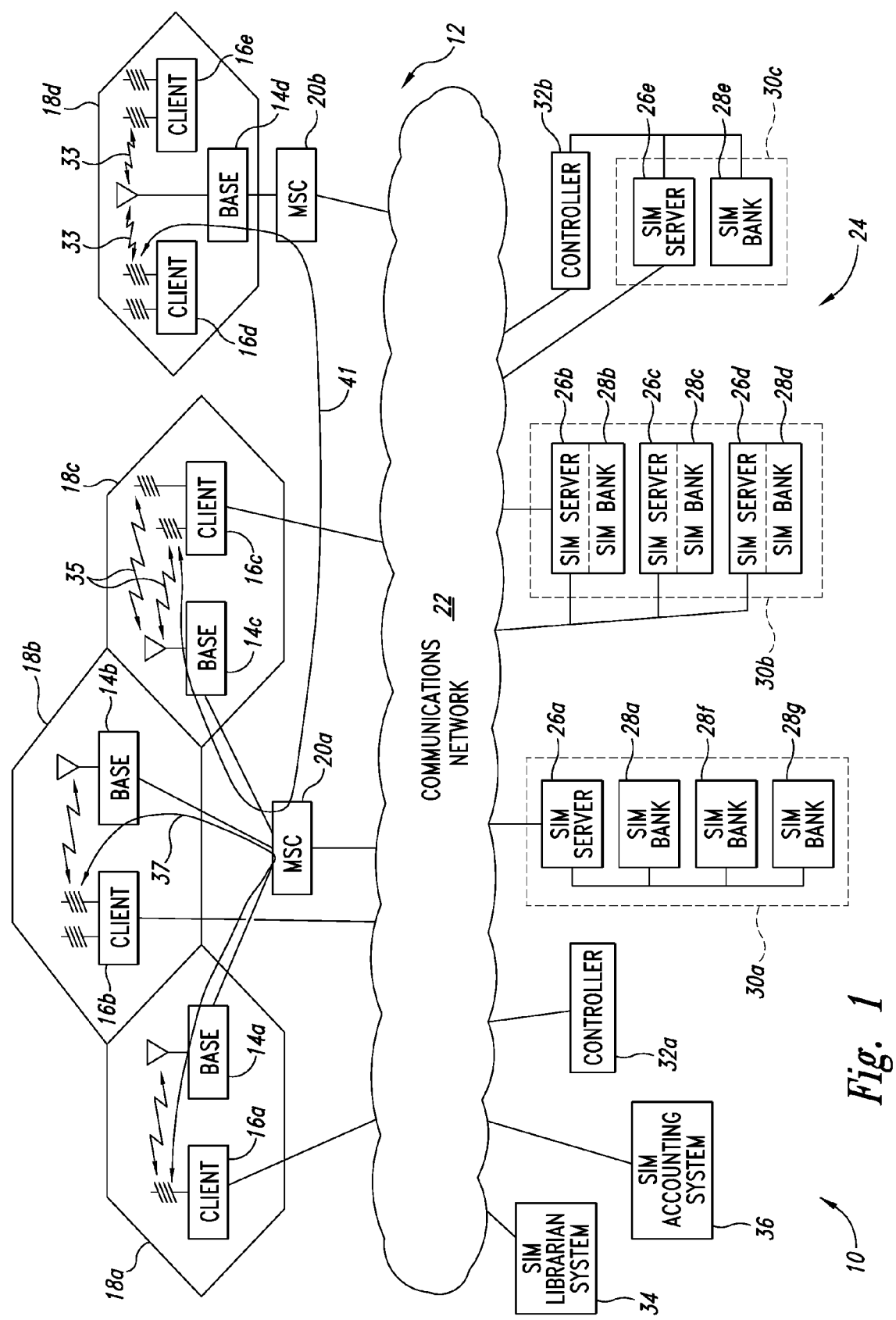
FIG. 1 is a diagramatic view of an exemplary SIM remote access system including a number of SIM servers, associated SIM banks, remote wireless communications clients, a SIM librarian computing system and a SIM accounting computing system operating in a wireless communications network environment according to one illustrated embodiment of the invention.

FIG. 1 shows a communications system 10 including a wireless communications environment such as a cellular network 12.

The cellular network 12 includes a number of cell sites or base stations, collectively referenced as 14 and individually referenced as 14a-14d. The cell site or base station 14 typically consists of an antenna tower, transceiver radios (i.e., base transceiver station), and radio controllers (i.e., base station controller). The base stations 14 each include a transceiver or transmitter and receiver through which radio links are established between the cellular network 12 and a number of wireless communication clients, collectively referenced as 16 and individually referenced as 16a-16d. The area served by each base station 14a-14d is commonly referred to as a cell, collectively referenced as 18 and individually referenced as 18a-18d, respectively. The cells 18 can vary in size depending upon terrain, capacity, demands, and other factors. The radio frequency that is assigned to one cell 18 can be limited to the boundary of that cell 18 by controlling the transmission power.

The cellular network 12 also includes a number of mobile telephone switching centers ("MSC"), collectively referenced as 20 and individually referenced as 20a, 20b, located at one or more mobile telephone switching offices ("MTSO") which route the transmissions. Additionally, the cellular network 12 may include one or more base cellular centers ("BSC"), not shown, coupled between the base stations 14 and the MSCs 20, for example, to handle call hand off. For convenience, the description will refer only to MSC, although one skilled in the art will recognize that many of the functions described as being performed by the MSC may alternatively or additionally be performed by the BSC.

The MSC 20 constantly monitors signal strength of both the caller and receiver, locating the next cell site when signal strength fades, and automatically rerouting the communications to maintain the communications link. For example, when a wireless communications client 16 moves from one cell to another cell (e.g., 18a to 18b), a computer at the MSC 20a monitors the movement, and transfers (i.e., handoff) the phone call from the first base station (e.g., 14a) to the new base station (e.g., 14b) at the appropriate time. The transfer will typically include switching of radio frequency. The transfer should be transparent to the users. Thus, the MSC 20 acts like a standard PSTN or ISDN switching node, and additionally provides mobile subscriber related functions such as registration, authentication, location updating, handovers and call routing to roaming subscribers.

As discussed in the background section, the MSC 20 typically employs two databases (e.g., HLR and VLR) for tracking subscribers and routing calls. The MSC 20 typically employs a database (e.g., AuC) for authenticating subscribers, and a separate database (e.g., EIR) for verifying the equipment. The MSC 20 typically allocates a routing number to each of the calls that the MSC 20 is switching. While the routing number is different than the unique subscriber identifier (e.g., IMSI) and the unique equipment identifier (e.g., IMEI), MTSO may define a relationship between the routing number and the subscriber and/or equipment identifiers associated with each wireless communications client 16. These identifiers allows the MSC 20 to track and coordinate all wireless communications clients 16 in its service area, and also allows the MSC 20 to determine the validity of the call and caller.

The MSC 20 routes calls using the communications network 22, which may include wireless as well as landline communications links. While the cellular network 12 provides wireless communications service and landline networks typically provide conventional communications service, such as conventional telephone service, these networks and services generally overlap. For example, a wireless communications user can place a call through the cellular network to the landline network to establish a communications link with a conventional communications device, such as a telephone. Conversely, a conventional communications device user can place a call through a landline network to a cellular network to establish a communications link with a wireless communications device such as a cellular phone. Thus, the cellular network 12 including the communications network 22 often includes communications links that may be considered part of the landline network, including POTS lines, trunk lines, and optical fiber to name a few.

SIM Remote Access System

The communications system 10 also includes a SIM remote access system 24 to provide remote access to information stored on SIMs. The SIM remote access system 24 includes a number of SIM servers, collectively referenced as 26 and individually referenced as 26a-26e, and a number of SIM banks, collectively referenced as 28 and individually referenced as 28a-28g, for receiving one or more SIMs. As used throughout this specification and claims, the term SIM refers to any computer- or processor-readable media that stores unique subscriber identifying information, such as, but not limited to, an IMSI and/or secret key, and/or that stores subscriber customization or configuration information.

As illustrated, a SIM server 26b may be associated with one SIM bank 28b, or a SIM server 26a may be associated with more than one SIM bank 28a, 28f, 28g. The SIM banks 28 may be housed separately from the associated SIM server 26a, for example, SIM banks 28a, 28f, 28g and SIM server 26a. Alternatively, the SIM banks 28 may be commonly housed with the associated servers 26, for example, SIM banks 28b-28d and SIM servers 26b-26d, respectively, as illustrated by the broken line therebetween.

Also as illustrated in FIG. 1, the SIM servers 26 and SIM banks 28 may be logically arranged in groups, identified by broken line boxes 30a-30c. Each SIM server 26 stores information regarding the SIMs associated with that SIM server 26. In the illustrated embodiment, each SIM server 26 in a group 30 also stores information about the SIMs associated with the other SIM servers 26 in the group 30. Thus, the SIM server 26b not only stores information regarding the SIMs in SIM bank 28b, but also stores information regarding the SIMs in the SIM banks 28c, 28d of the same group 30b. The stored information may provide an easy or alternative method of identifying the particular SIM or characteristics of the SIM, as explained in detail below.

The wireless communications clients 16 may access the information stored or provided by the SIMs through the communications network 22 via the respective associated SIM servers 26. The remote SIM access system 24 may be composed of any one or more of the SIM servers 26 and SIM bank 28 in any one or more of the relationships illustrated in FIG. 1 or in other relationships not specifically illustrated.

The remote SIM access system 24 may include one or more controllers, collectively referenced as 32 and individually referenced as 32a, 32b, to remotely control one or more wireless communications clients 16. The controllers 32 can send commands to the wireless communications clients 16 via the communications network 22, allowing automatic or manual remote operation of the wireless communications client 16 from one or more local or central locations. The controllers 32 may allow real time testing by an operator of remote switches and/or wireless communications. Additionally, or alternatively, the controllers 32 may allow automated scheduled testing of remote switches and/or wireless communications. Automated testing may be scheduled, for example, for non-peak times to limit the loss of valuable cellular capacity, or may be scheduled during peak times, for example when testing system performance under peak demand conditions.

The SIM remote access system 24 may also include a SIM librarian, for example, in the form a SIM librarian computing system 34 to track the location of the SIMs in the various SIM banks 28 across a portion or all of the SIM remote access system 24. The SIM librarian system 34 may communicate with the SIM servers 26 via the communications network 22, to provide computer-routable address information for various requested SIMs. The SIM librarian system 34 may also perform queries and/or receive new and/or updated SIM location information via the communications network 22. The SIM librarian computing system 34 may map a number of human-recognizable identifiers for each of the SIMs to respective computer-routable address information for accessing the subscriber identity information and/or subscriber configuration information stored in the respective SIM. Additionally, or alternatively the SIM librarian computing system 34 may map SIM characteristics for each of the SIMs to respective computer-routable address information for accessing the subscriber identity information and/or subscriber configuration information stored or provided by the respective SIM. Such mappings allow the formulation of simple human-recognizable text searches or queries to locate corresponding SIMs.

While illustrated as having one SIM librarian computing system 34, some embodiments of the SIM remote access system 24 may include more than one SIM librarian computing system 34. Having multiple SIM librarian computing systems 34 may provide a number of benefits, such as redundancy and faster access time, however multiple SIM librarian computing systems 34 may produce a number of detriments, such as added overhead in time and cost of maintaining redundant information, and the possibility of inconsistencies between the SIM librarian computing systems 34.

The SIM remote access system 24 may also include an accounting system such as a SIM accounting computing system 36 to account for SIM usage by one or more billing or tracking entities. The SIM accounting computing system 36 may receive SIM usage information from the SIM servers 26 and/or the wireless communications clients 16 via the communications network 22, as is explained in detail below.

The tracking entities may be separate companies or businesses, and/or may be separate divisions within a single company or business. The SIM accounting system computing 36 may allow companies to simply track SIM usage, allocate cost for SIM usage in budgeting, and/or even bill or invoice for actual SIM usage. For example, a division within a company may own a set of SIMs which the division routinely accesses, but the division may require occasional use of the SIMs of another division, which can be accounted for using the SIM accounting computing system 36. Additionally, or alternatively, an access providing business entity can own a number of SIMs, and can employ the SIM accounting computing system 36 to rent or lease SIM usage to other entities. For example, under one business model the access providing business entity owns a number of SIMs and provides a number of different wireless communications providers or testing companies with remote access to the SIMs using the SIM accounting computing system 36. In a variation on the business model, the access providing business may also own a number of wireless communications clients located in the field for remote testing. Under this model, the access providing business may simply provide wireless communications providers with access to the wireless communications clients, or may actually perform testing for the wireless communications providers.

Figure 4:
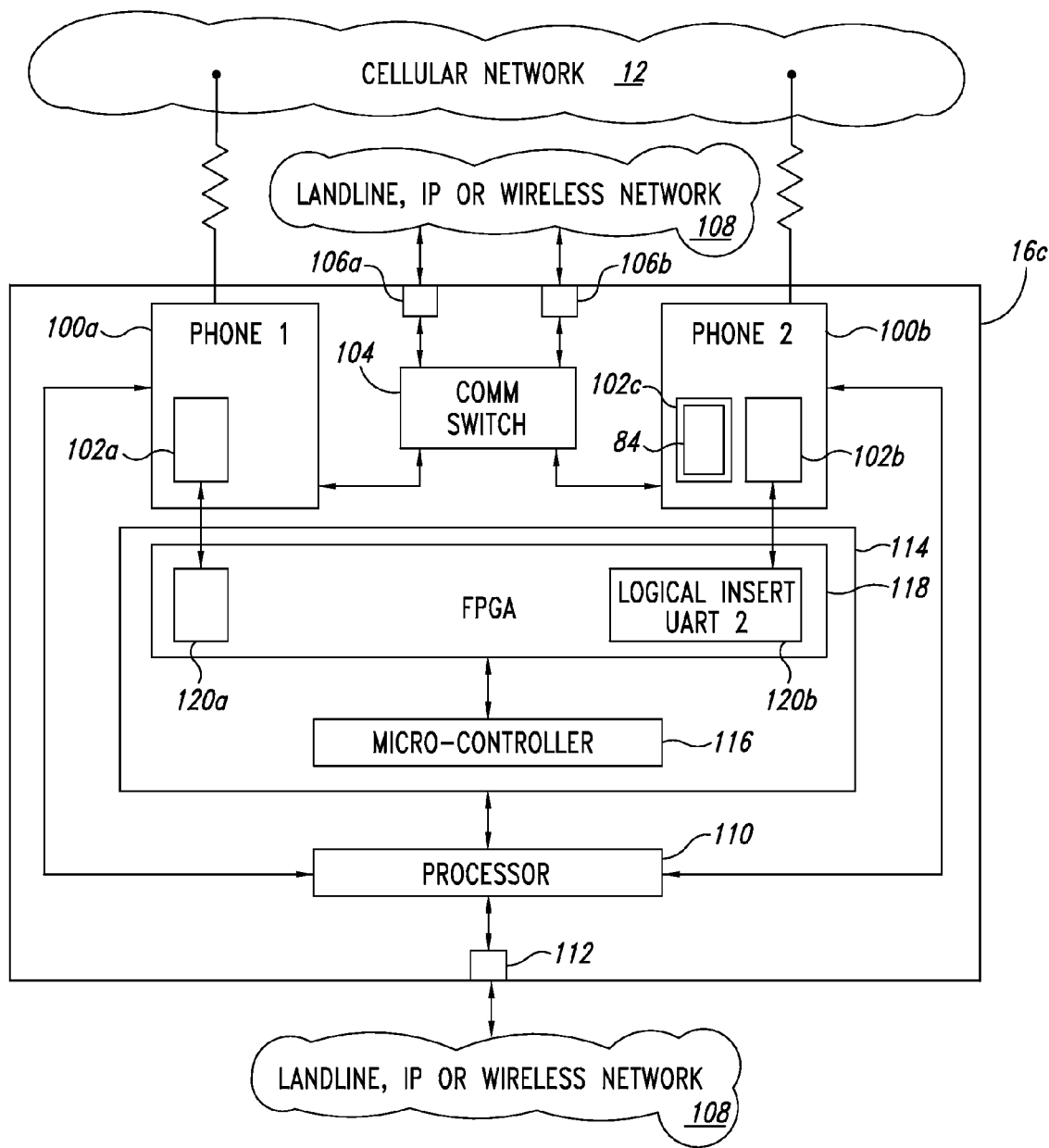
FIG. 4 is a schematic diagram of a remote wireless communications client in the form of a remote test platform having a pair of wireless communications devices.

FIG. 1 illustrates a small number of the possible communications links which may be established. For example, the controller 32a may cause the wireless communications client 16b in one cell 18b to establish a communications link, illustrated by double headed arrow 37, with a wireless communications client 16a in another cell 18a. In another example, the controller 32a may cause the wireless communications client 16c in one cell 18b to establish a wireless communications link, illustrated by double headed arrows 35, with itself, where the wireless communications client 16c includes two separately addressable wireless communications devices 100a, 100b (FIG. 4). In a further example, the controller 32b may cause the wireless communications client 16d in one cell 18d to establish a wireless communications link, illustrated by double headed arrow 33, with a wireless communications client 16e in the same cell 18d. In yet a further example, the controller 32a may cause the wireless communications client 16c in one cell 18c associated with the one MSC 20a to establish a wireless communications link, illustrated by double headed arrow 41, with a wireless communications client 16d in another cell 18d through another MSC 20b. Other variations are of course possible, as will be recognized by one skilled in the art with an understanding of these teachings.

Typically, such communications links may be used to test switching in the cellular network 12. However, such communications links may also be used to remotely provide identities and/or configurations to the wireless communications clients 16. For example, a wireless PDA 16A in a remote geographic location 18a may take on a desired set of properties associated with a SIM in a locally located SIM bank 28a. Thus, for example, a successive number of SIMs can be selected such that the wireless communications device 16a is always in a "home calling area" as it travels from cell 18a to cell 18d. Additionally, or alternatively, the wireless client 16 can take on the identity of any desired wireless communications device, such as a wireless PDA by remotely assigning the appropriate SIM to the wireless communications device 16.

System Hardware

Figure 2:
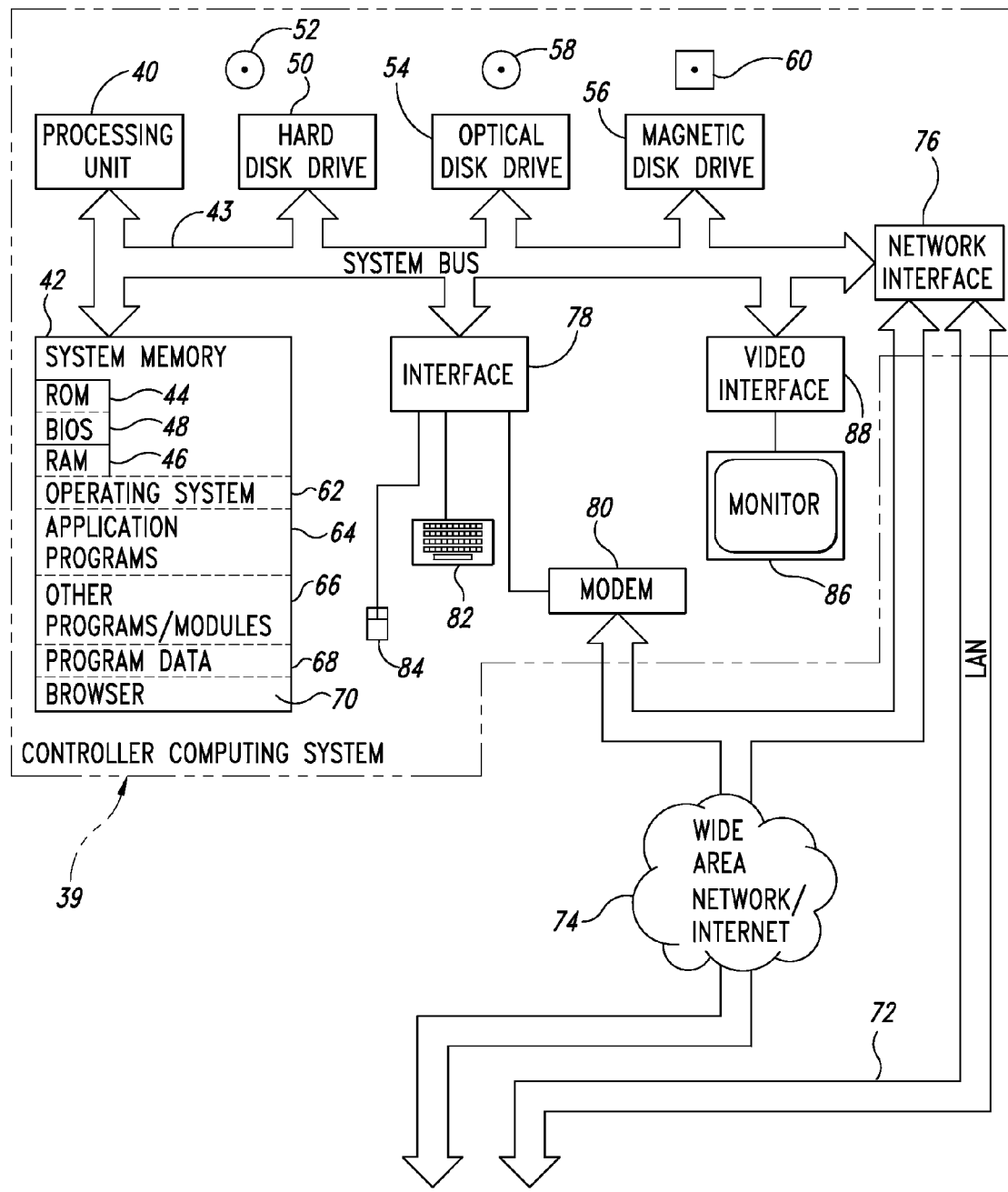
FIG. 2 is a schematic diagram of a computing system which may be configured as a local or central controller computing system, a SIM server, a SIM librarian computing system or SIM accounting computing system of the SIM remote access system of FIG. 1.

FIG. 2 and the following discussion provide a brief and general description of a suitable computing environment in which embodiments of the invention can be implemented, particularly those of FIG. 1. Although not required, embodiments of the invention will be described in the general context of computer-executable instructions, such as program application modules, objects or macros being executed by a computer. Those skilled in the relevant art will appreciate that the invention can be practiced with other computing system configurations, including hand-held devices, multiprocessor systems, microprocessor-based or programmable consumer electronics, personal computers ("PCs"), network PCs, mini-computers, mainframe computers, and the like. The invention can be practiced in distributed computing environments where tasks or modules are performed by remote processing devices, which are linked through a communications network. In a distributed computing environment, program modules may be located in both local and remote memory storage devices.

The subject matter of FIG. 2 and the following discussion may be generally or specifically relevant to computing systems suitable for use as any one or more of the SIM servers 26, controllers 32, SIM librarian computing system 34, and/or SIM accounting computing system 36, ect. In the interest of brevity, only significant differences in hardware and operation of the various computing systems 26, 32, 34, 36 will be set out and discussed separately.

Referring to FIG. 2, a computing system 39 includes a processing unit 40, a system memory 42, and a system bus 43 that couples various system components including the system memory 42 to the processing unit 40. The computing system 39 will at times be referred to in the singular herein, but this is not intended to limit the application of the invention to a single computing system 39 since in typical embodiments, there will be more than one computing system 39 or other device involved. The SIM remote access system 24 may employ other computing systems, such as convention and personal computers, where the size or scale of the system allows. The processing unit 40 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 2 are of conventional design. As a result, such blocks need not be described in further detail herein, as they will be understood by those skilled in the relevant art.

The system bus 43 can employ any known bus structures or architectures, including a memory bus with memory controller, a peripheral bus, and a local bus. The system memory 42 includes read-only memory ("ROM") 44 and random access memory ("RAM") 46. A basic input/output system ("BIOS") 48, which can form part of the ROM 44, contains basic routines that help transfer information between elements within the computing system 39, such as during startup.

The computing system 39 also includes a hard disk drive 50 for reading from and writing to a hard disk 52, and an optical disk drive 54 and a magnetic disk drive 56 for reading from and writing to removable optical disks 58 and magnetic disks 60, respectively. The optical disk 58 can be read by a CD-ROM, while the magnetic disk 60 can be a magnetic floppy disk or diskette. The hard disk drive 50, optical disk drive 54 and magnetic disk drive 56 communicate with the processing unit 40 via the bus 43. The hard disk drive 50, optical disk drive 54 and magnetic disk drive 56 may include interfaces or controllers (not shown) coupled between such drives and the bus 43, as is known by those skilled in the relevant art. The drives 50, 54 and 56, and their associated computer-readable media, provide non-volatile storage of computer readable instructions, data structures, program modules and other data for the computing system 39. Although the depicted computing system 39 employs hard disk 52, optical disk 58 and magnetic disk 60, those skilled in the relevant art will appreciate that other types of computer-readable media that can store data accessible by a computer may be employed, such a magnetic cassettes, flash memory cards, digital video disks ("DVD"), Bernoulli cartridges, RAMs, ROMs, smart cards, etc.

Program modules can be stored in the system memory 42, such as an operating system 62, one or more application programs 64, other programs or modules 66 and program data 68. The system memory 42 may also include a web client or browser 70 for permitting the computing system 39 to access and exchange data with sources such as website of the Internet, corporate Intranets, or other networks as described below, as well as other server applications on server computers such as those further discussed below. The browser 70 in the depicted embodiment is markup language based, such as hypertext markup language ("HTML"), extensible markup language ("XML") or wireless markup language ("WML"), and operates with markup language that use syntactically delimited characters added to the data of a document to represent the structure of the document. A number of web clients or browsers are commercial available such as Netscape Navigator from America Online and Internet Explorer available from Microsoft, Redmond, Wash.

While shown in FIG. 2 as being stored in the system memory 42, the operating system 62, application program 64, and other programs/modules 66, program data 68 and browser 70 can be stored on the hard disk 52 of the hard disk drive 50, the optical disk 58 of the optical disk drive 54 and/or the magnetic disk 60 of the magnetic disk drive 56.

The computing system 39 can operate in a networked environment using logical connections to one or more remote computers, such as the wireless communications clients 16, controllers 32, SIM servers 26, SIM librarian computing system 34, and/or SIM accounting computing system 36. The computing system 39 is logically connected to one or more other computing systems 39 under any known method of permitting computers to communicate, such as through a local area network ("LAN") 72, or a wide area network ("WAN") including, for example, the Internet 74. Such networking environments are well known including wired and wireless enterprise-wide computer networks, intranets, extranets, and the Internet. Other embodiments include other types of communication networks such as telecommunications networks, cellular networks, paging networks, and other mobile networks. When used in a LAN networking environment, the computing system 39 is connected to the LAN 72 through an adapter or network interface 76 (communicative linked to the bus 43). When used in a WAN networking environment, the computing system 39 may include an interface 78 and modem 80 or other device, such as the network interface 76, for establishing communications over the WAN/Internet 74.

The modem 80 is shown in FIG. 2 as communicatively linked between the interface 78 and the WAN/Internet 74. In a networked environment, program modules, application programs, or data, or portions thereof, can be stored in the computing system 39 for provision to the networked computers. In one embodiment, the computing system 39 is communicatively linked through the LAN 72 or WAN/Internet 74 with TCP/IP middle layer network protocols; however, other similar network protocol layers are used in other embodiments, such as user datagram protocol ("UDP"). Those skilled in the relevant art will readily recognize that the network connections shown in FIG. 2 are only some examples of establishing communications links between computers, and other links may be used, including wireless links.

An operator can enter commands and information into the computing system 39 through optional input devices, such as a keyboard 82, and a pointing device, such as a mouse 84. Other input devices can include a microphone, joystick, scanner, etc. These and other input devices are connected to the processing unit 40 through the interface 78, such as a serial port interface that couples to the bus 43, although other interfaces, such as a parallel port, a game port, or a wireless interface, or a universal serial bus ("USB") can be used. A monitor 86 or other display device is coupled to the bus 43 via a video interface 88, such as a video adapter. The computing system 39 can include other output devices, such as speakers, printers, etc.

The significant differences between the SIM server 26, controller computing system 32, SIM librarian computing system 34, and SIM accounting computing system 36 are typically in the operation of the various computing systems 26, 32, 34, 36, as embodied the particular application programs, other programs/modules, program data and/or operating system loaded in the system memory 42, and is discussed in detail below.

Figure 3:
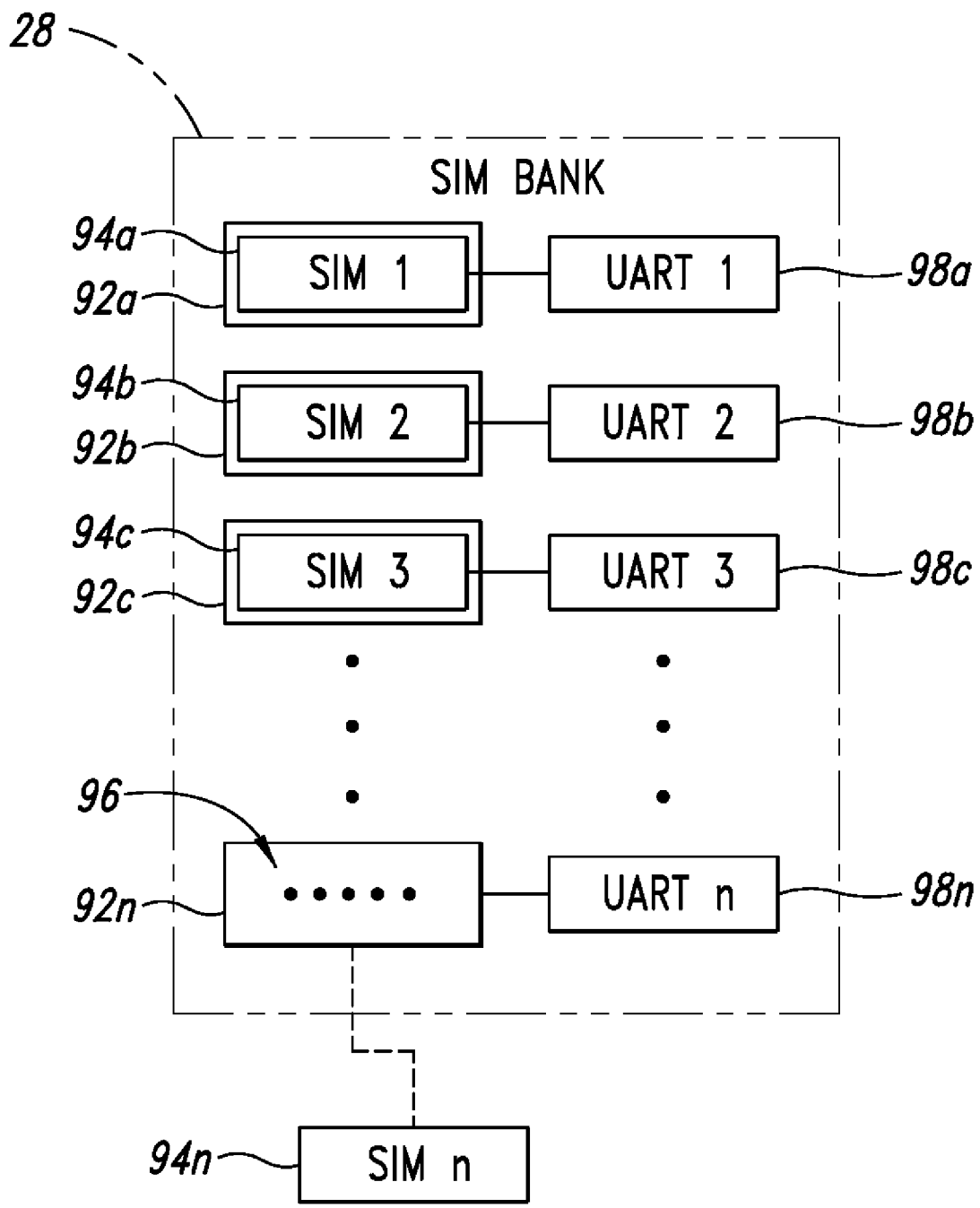
FIG. 3 is a schematic diagram of a SIM bank.

FIG. 3 shows the SIM bank 28, having a number of positions, for example slots, collectively referenced as 92 and individually referenced as 92a-92n, sized and dimensioned for receiving SIMs, collectively referenced as 94 and individually referenced as 94a-94n. In FIG. 2, one SIM 94n is shown removed from the SIM slot 92n, exposing an interface 96 for communicatingly coupling to a complementary interface on the SIM 94n. The interface 96 may, for example, take the form of a number of electrical contacts or optical transceivers aligned to communicatingly couple with a complementary interface (not shown) on the SIM 94n.

The SIM server 26 and SIM bank 28 can share a common housing as illustrated in FIG. 1 by SIM servers 26b-26d and associated SIM banks 28b-28d. Alternately, the SIM server 26 may be separately housed from the respective SIM bank 28 as illustrated in FIG. 1 by SIM servers 26a, 26e and associated SIM banks 28a, 28f, 28g, and 28e.

A universal asynchronous receiver/transceiver ("UART"), collectively referenced as 98 and individually referenced as 98a-98n, is associated with each of the SIM slots 92a-92n. The UART 98 is a device, usually in the form of an integrated circuit, that performs the parallel-to-serial conversion of digital data that has been transmitted, for example, from a modem or other serial port, for use by a computer, and which converts parallel to serial, for example, suitable for asynchronous transmission over phone lines. While illustrated as a portion of the SIM bank 28, the UARTs 98 may be housed within the SIM server 26.

FIG. 4 shows an example of a remote wireless communications client 16 in the form of a remote test platform 16c including a first and a second wireless communications device, collectively referenced as 100 and individually referenced as 100a, 100b. In the illustrated embodiment, the wireless communications devices 100a, 100b can take the form of cellular telephones, with or without their individual housings, keypads and/or displays, each of the cellular telephones including one or more SIM interfaces 102a, 102b, respectively, such a SIM slots, electrical contacts such as pins, optical transceivers or other interfaces. In some embodiments, the SIM interfaces 102a, 102b may be empty, the wireless communications device 100a, 100b completely relying on remote access to SIMs 94, while in other embodiments one or more SIM interfaces 102c may contain a SIM 84 for local access. The wireless communications devices 100a, 100b wirelessly communicate via the cellular network 12.

The remote test platform 16c includes communications switch 104 such as an audio switch which can cross-couple an input and output between the two wireless communications devices 100a, 100b. The communications switch 104 can also couple audio and data signals received at one or more physical and/or virtual ports 106a, 106b by way of, for example, a network 108 such as a landline network, IP network, voice-over-IP network, wireless modem or wireless data communications network such as GPRS, 1XRTT to name a few, which may be the same as, or a portion of, the communications network 22 (FIG. 1). The remote test platform 16c also includes a processor 110, which receives commands and data at a port 112 by way of the network 108. The processor 110 controls the wireless communication devices 100a, 100b, as described in detail below. The processor 110 also couples to a bridge 114 that includes a controller such as a micro-controller 116, and a field programmable gate array 118. The field programmable gate array 118 includes logical insertion UARTs 120a, 120b which provide information from the SIM 94, such as subscriber identity information and/or subscriber configuration information, in a serial stream at respective SIM interfaces 102a, 102b.

Figure 5:
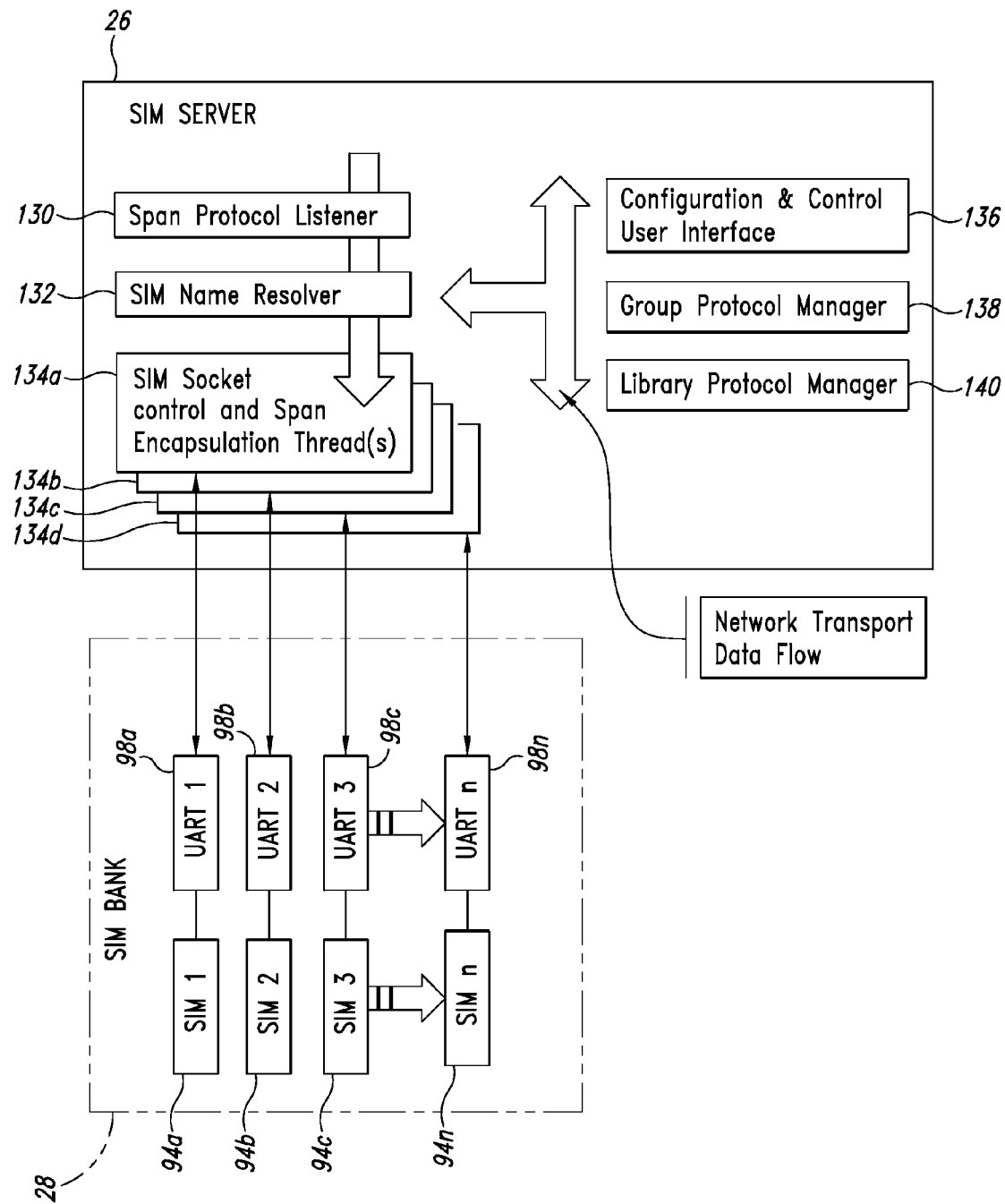
FIG. 5 a logical diagram of the SIM server and SIM bank of FIG. 1.

FIG. 5 is the logical representation of the SIM server 26 and SIM bank 28. SIM server 26 operates according to instructions stored in the system memory 42 (FIG. 2), for example, instructions stored as the operating system 62, application program 64, other programs/modules 66, program data 68 and/or browser 70. While the above description presents a physical embodiment of the SIM server 26, under the logical embodiment each process, instance or session spawned by the SIM server computing system constitutes a separate "SIM server" The SIM server 26 ensures that power and ground are applied to the various contacts of each of the SIMs 94 in the correct order.

The SIM server 26 includes a span protocol listener 130 that monitors a communications port for requests from the remote wireless communications clients 16. Requests may include requests to associate a SIM 94 with a wireless communications client 16, or requests to transfer information to and/or from the SIM 94. The SIM server 26 also includes a SIM name resolver 132 that resolves human-recognizable names into a computer-recognizable name. The SIM server 26 further includes a number of SIM socket control and span encapsulation threads, collectively identified as 134 and individually identified as 134a-134d. The instances of SIM socket control and span encapsulation threads provide various remote wireless communications clients 16 with access to the SIM information from the various SIMs 94, such as subscriber identity information and/or subscriber configuration information via bidirectional communications.

The SIM server 26 includes a configuration and control user interface 136 to handle interactions with the various wireless communications clients 16. The configuration and control user interface 136 allows the SIM server 26 to receive requests and to respond to such requests with either the requested SIM information or with an address for retrieving the requested SIM information.

The SIM server 26 includes a group protocol manager 138 which handles the interaction between SIM servers 26 in a group, such as SIM servers 26b, 26c, 26d of the SIM server group 30b (FIG. 1). For example, the group protocol manager 138 allows the interchange of SIM location/identification information between the various SIM servers 26b, 26c, 26d of the SIM server group 30b. Thus, all SIM servers 26 in the SIM server group 30 have up-to-date information about the SIMs 94 in all of the SIM banks 28 associated with the SIM servers 26 included in the particular SIM server group 30.

The SIM server 26 includes a library protocol manager 140 that controls interaction with the SIM librarian computing system 34. This allows any one of the SIM servers 26 to locate SIMs 94 in SIM banks 28 associated with other SIM servers 26 that are not included within the same SIM server group 30 as the inquiring SIM server 26.

Figure 6:
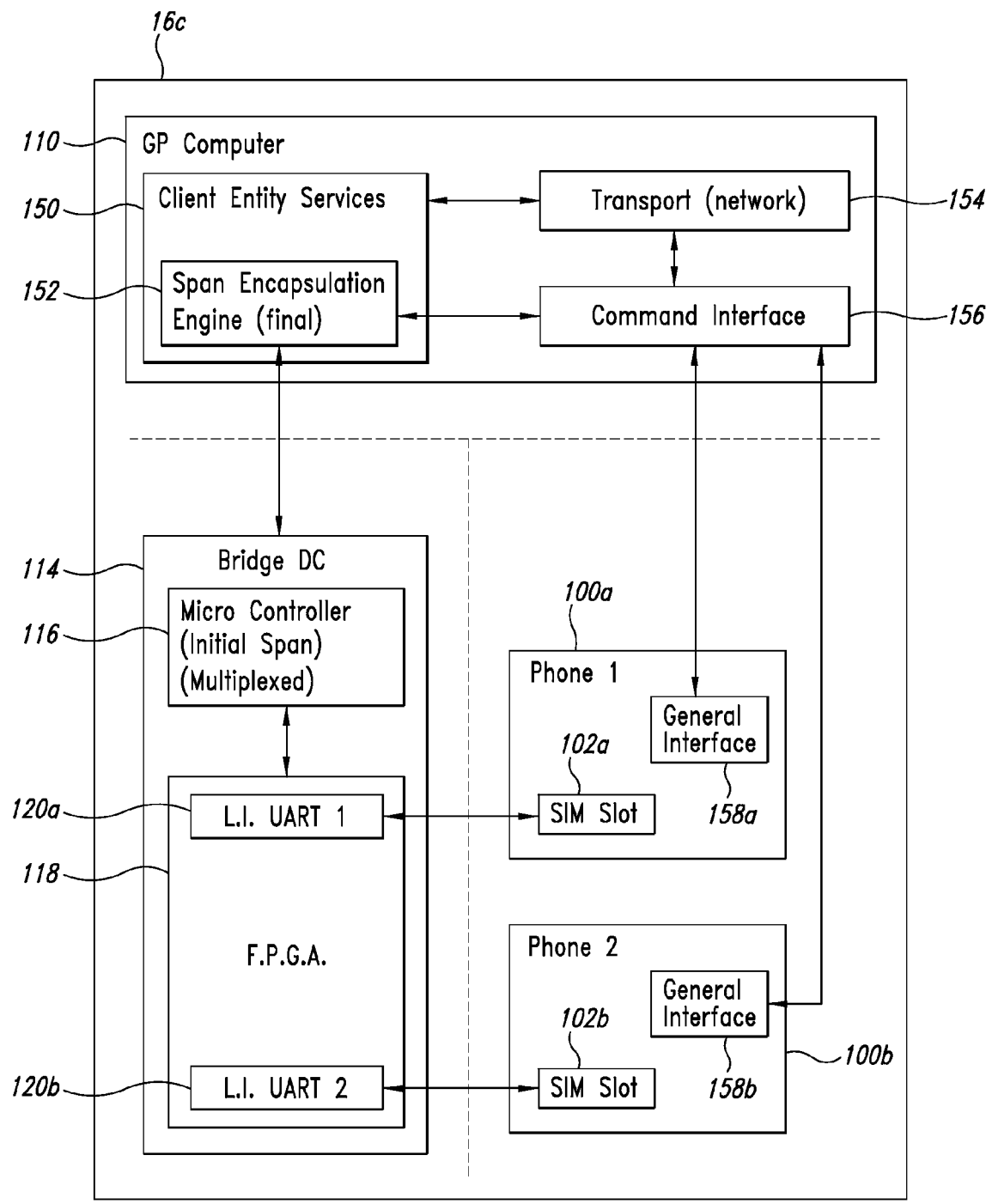
FIG. 6 is a logical diagram of the remote communications client of FIG. 1, the remote communications client taking the form of a remote test platform having two remote wireless communications devices.

FIG. 6 shows a logical representation of the remote wireless communications client 16 in the form of a remote test platform 16c. The processor 110 provides client entity services 150. The processor 110 also provides a span encapsulation engine 152 for handling the interaction between the processor 110 and the bridge 114, for example creating and/or opening envelopes including packets of data such as SIM information. The processor 110 employs a transport 154 between the client entity services 150 and a command interface 156 which may be manual and/or automated. The command interface 156 interacts with a general interface 158a, 158b which is a logical function of the wireless communications devices 100a, 100b, respectively.

Figure 7:
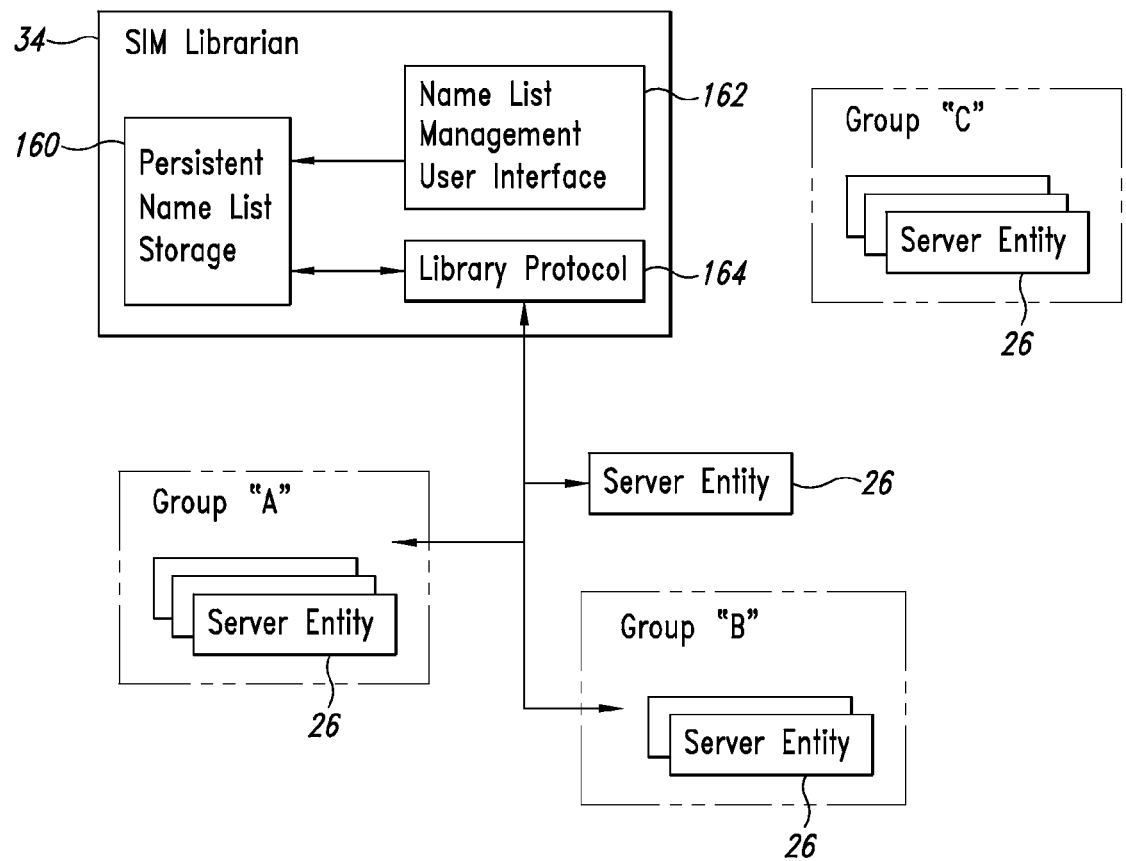
FIG. 7 is a logical diagram of the SIM librarian computing system of the wireless communications system of FIG. 1.

FIG. 7 shows a logical view of the SIM librarian computing system 34 having instructions stored in the system memory 42 for tracking network addresses of particular SIMs 94 and providing the network addresses in response to queries. The SIM librarian computing system 34 includes a persistent name list storage 160 which may, for example, take the form of a data structure 338 (FIG. 12) stored in system memory 42. The data structure 338 may include one or more human-recognizable names for the SIM 94 (FIG. 3), a network address for the SIM 94 including an address of a SIM server 26 (FIG. 1) having access to the SIM bank 28 holding the SIM 94. The data structure 338 may further include additional information such as geographic location of the SIM 94 and/or a description of the contents of the SIM 94 including SIM information such as the subscriber identification information (e.g., ISMI) and/or subscriber configuration information, as discussed in detail below with reference to FIG. 12.

The SIM librarian computing system 34 also includes a name list management user interface 162. The name list management user interface 162 handles the maintenance of the persistent name list storage 160, for example creating, modifying and/or deleting information from the persistent name list storage 160.

The SIM librarian computing system 34 further includes a library protocol 164 which allows SIM servers 26 to access information in the persistent name list storage 160. The library protocol 164 may further allow the SIM librarian computing system 34 to pass inquiries to the SIM servers 26, for example, to verify existing information in the persistent name list storage 160, and/or receive new and updated information from the SIM servers 26 for use in maintaining the persistent name list storage 160. In use, a remote wireless communications client 16 connecting to any SIM server 26a, 26e not in the SIM server group 30b (FIG. 1) will effectively search every server 26a, 26e not in the SIM server group 30b with a single request. To query the SIM servers 26b-26d in the SIM server group 30b requires a separate connect sequence. Thus, to scan every SIM server 26a-26e, a remote wireless communications client 16 would have to have only two servers saved in its configuration files.

Operating A Wireless Communications Client

Figure 8:
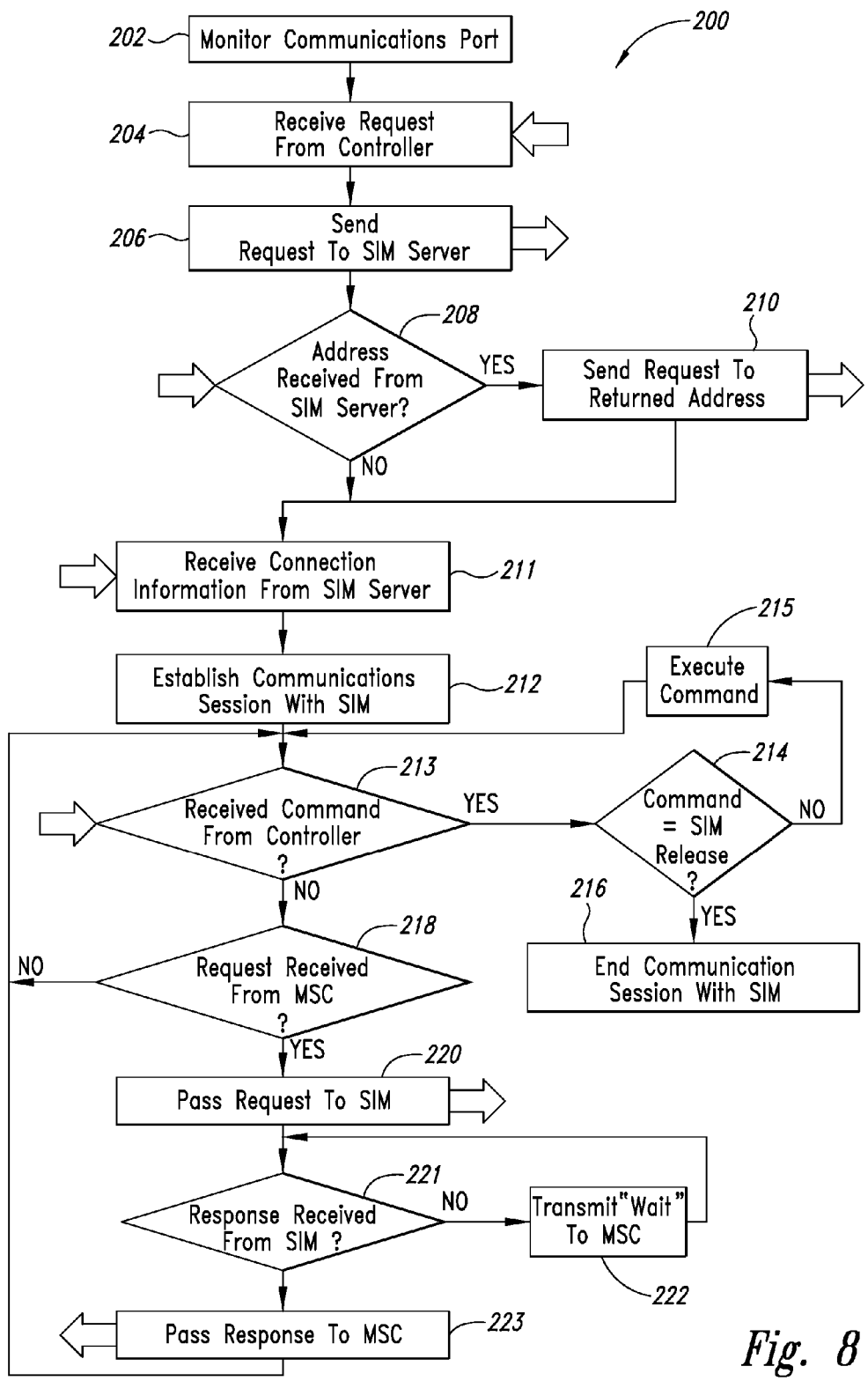
FIG. 8 is a flow diagram of an illustrated method of operating of the remote wireless communications client FIG. 1.

FIG. 8 shows a method 200 of operating a wireless communications client 16 according to one illustrated exemplary embodiment. In step 202, the general computer 110 (FIG. 6) of the wireless communications client 16 monitors one or more communications ports 106, 112 (FIG. 4). As discussed above, the communications ports may take the form of physical port and/or virtual ports. The flow of data and or commands between the wireless communications client 16 and other system components are illustrated by large arrows pointing into and away from the various boxes which represent the acts and steps of the method. A similar convention is employed in the Figures illustrating other methods of operation of the SIM remote access system 24.

In step 204, the wireless communications client 16 receives a request for a SIM 94, for example, from one of the controllers 32 (FIG. 1). The request may include a unique SIM identifier and/or a human-recognizable name corresponding to the SIM 94 or group of SIMs 94. In step 206, the wireless communications client 16 sends a request for the SIM 94 to a SIM server 26. In step 208, the wireless communications client 16 determines whether an address is received from the SIM server 26. If an address is received in step 208, the wireless communications client 16 sends another request in step 210, this request being sent to an address returned by the SIM server 26. In step 211, the wireless communications client 16 receives connection information from the SIM server 26 to which the request was addressed in either step 206 or 210.

In step 212, the general purpose computer 110 employs the bridge 114 to associate one the wireless communications device 100 of the wireless communications client 16 with the subscriber information from the SIM 94 by establishing a communications session between the wireless communications device 100 and the SIM 94. The communications session may employ a socket protocol for establishing a persistent communications session, lasting until the SIM 94 is explicitly released.

With a persistent communications session started, in step 213 the wireless communications client 16 determines whether a command is received, for example, from the controller 32. If a command has been received, in step 214 the wireless communications client 16 determines whether the command is to release the SIM 94. If the command is not to release the SIM 94, the wireless communications client 16 employs the command interface 156 to execute the command in step 215, operating the wireless communications device 100 via the general interface 158, the method 200 then returning to step 213. If the command is to release the SIM 94, in step 216 the wireless communications client 16 employs the client entity services 150 to release the SIM 94, for example, by sending an appropriate message to the SIM server 26 and terminating the communications session with the SIM 94 via the span encapsulation engine 152.

In step 218, the wireless communications device 16 determines whether a request is received, for example, from the MSC 20. As discussed in the background, the MSC 20 may, from time-to-time, request certain information from the SIM 94, including challenging the SIM 94 with an authentication request. Under the GSM standard the authorization request includes a random number or seed. If a request has not been received, the method 200 returns to step 213. If a request has been received, the wireless communications client 16 employs the span encapsulation engine 152 to pass the request to the SIM 94 via the communications session in step 220.

In step 221, the wireless communications client 16 determines whether a response is received from the SIM 94, transmitting wait signals back to the requester (e.g., MSC 20) in step 222 where required to prevent a time out from occurring. Often, the MSC 20 or other portion of the wireless service provider system will require a response from the wireless communications client 16 within a specified time period. Step 222 provides a "Wait" message to the MSC 20 or other portion of the wireless service provider system. In some instances, successive "wait" messages can provide a sufficient response, although some wireless service provider systems will limit the number of consecutive "Wait" messages that may be received before terminating the connection. The "Wait" loop repeats until the wireless communications client 16 receives a response from the SIM 94, at which point control passes to step 223. Once a response is received from the SIM 94, the wireless communications client 16 passes the response to the requester (e.g., MSC 20) in step 223, and returns to step 213.

It should be noted that the wireless communications device 16 is capable of handling multiple communications sessions at the same time, for example, the wireless communications device 16 may simultaneously be handling a separate communications session for each of the wireless communications clients 100a, 100b. Thus, the wireless communications device 16 continues monitoring the communications port (i.e., step 202), while executing other portions of the method 200. The general computer 110 of the wireless communications client 16 may employ a multitasking strategy, multiple processors or other techniques to realize such concurrent operation.

Operating A SIM Server

Figure 9A:
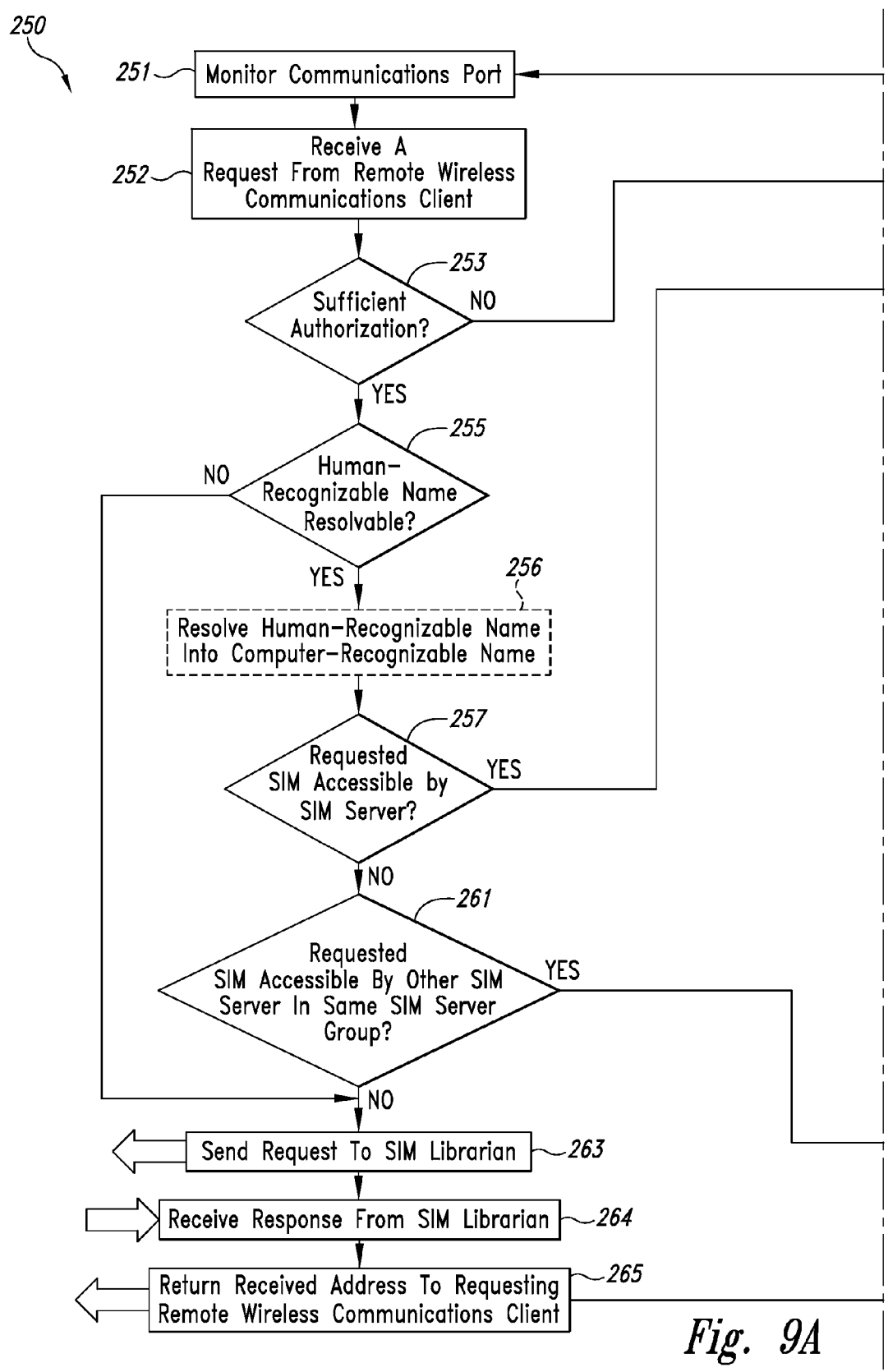
FIGS. 9A and 9B are a flow diagram of an illustrated method of operating the SIM server of FIG. 1.
Figure 9B:
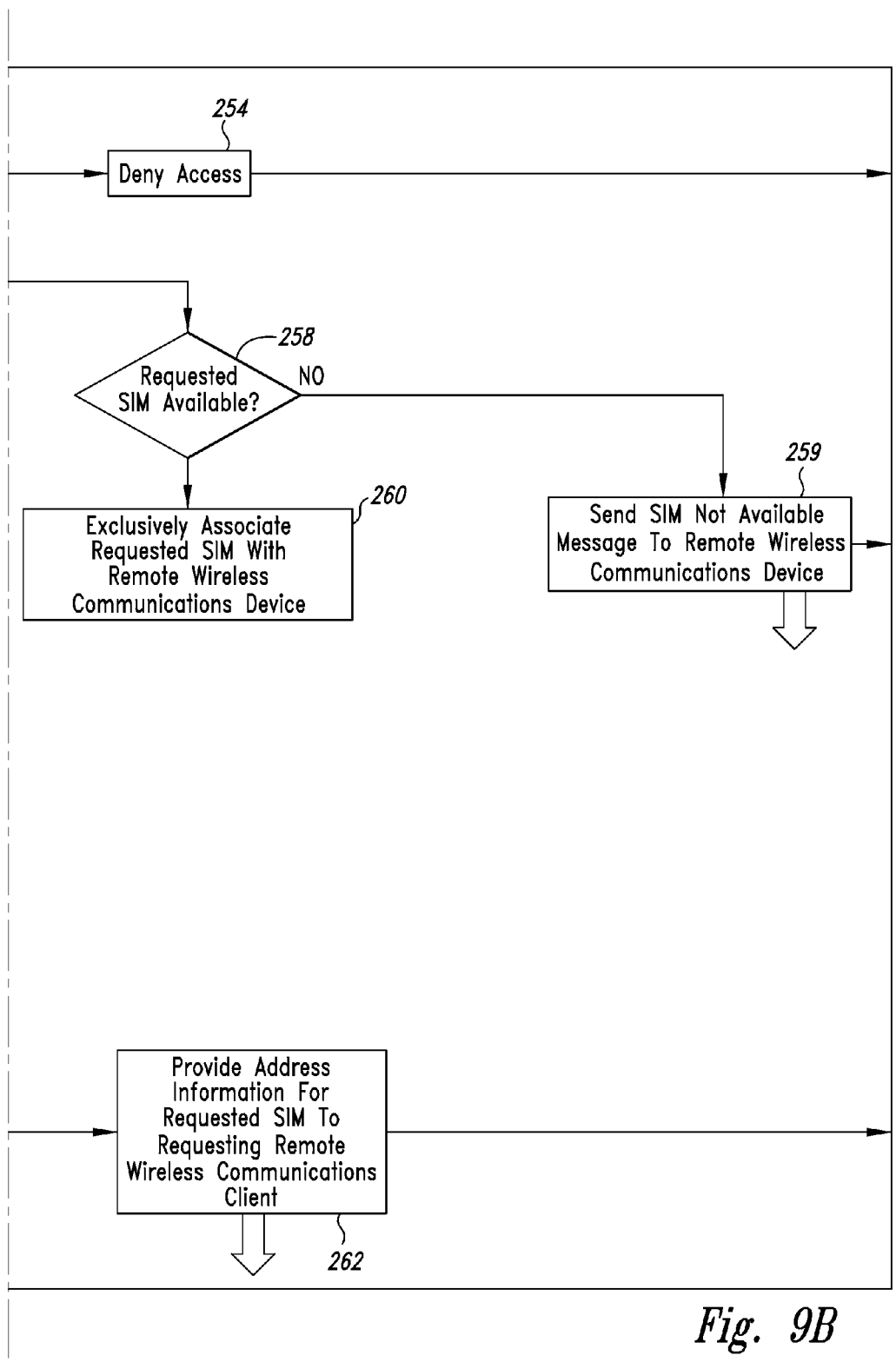

FIGS. 9A and 9B show a method 250 of operating a SIM server 26 according to one illustrated exemplary embodiment.

In step 251, the span protocol listener 130 (FIG. 5) of the SIM server 26 monitors a communications port. In step 252, the SIM server 26 receives a request from a remote wireless communications client 16. The request may originate with the remote wireless communications client 16, or may originate with the controller 32.

In optional step 253, the SIM server 26 determines whether the request includes sufficient authorization to provide access to the requested SIM information. Authorization can take any one or more of a variety of forms. For example, the request can include one or more user identifiers and/or passwords generated by one or both of the controller 32 and the requesting wireless communications client 16. The user identifier may be associated with a privilege level, allowing certain types of access to certain SIMs 94. Alternatively, or additionally, the request may contain an indication of a business, tracking or billing entity making the request. This information can be compared with SIM ownership information stored in the requested SIM 94 and/or stored locally at the SIM server 26 for allowing authorization determinations without inquiries to the SIM 94. Thus, in some embodiments the SIM server 26 may read information from the requested SIM 94 in order to determine whether the request includes sufficient authority, while in other embodiments the SIM server 26 makes the determination without resort to the requested SIM 94, relying on pre-stored information or on a level of authority that is not specific to the particular SIM 94. Consequently, it should be clear to one skilled in the art that the optional step 253 may occur at other points in the method 250.

If the request does not include sufficient authorization, the SIM server 26 denies the request in step 254, perhaps passing an appropriate message to the requesting wireless communications device 16 and/or controller 32. The method 250 then returns to a "wait" state, monitoring the communications port in step 251. Additionally, or alternatively, the SIM server 26 may track the number of unauthorized requests for the SIM 94, or may track the number of unauthorized requests by the particular requesting wireless communications client 16, to deter unauthorized entries. If the request does include sufficient authorization, the SIM server 26 passes control to step 255.

In step 255, the SIM name resolver 132 (FIG. 5) of the SIM server 26 determines whether a received human-recognizable name for the SIM 94 is resolvable. If the name is not resolvable, the method 250 passes control to step 269 where a request is sent to the SIM librarian 34, details of which are explained below. If the human-recognizable name is resolvable, the SIM name resolver 132 resolves the human-recognizable name into a computer-recognizable or computer-routable name in step 256.

In step 257, the SIM server 26 determines whether the requested SIM 94 is accessible by the SIM server 26. SIMs 94 are considered accessible by the SIM server 26 if the SIM server 26 can read, write and/or command the SIM 94, for example where the SIM 94 is in a SIM bank 28 associated with the SIM server 26. If the requested SIM 94 is accessible by the SIM server 26, in step 258 the SIM server 26 determines whether the requested SIM 94 is available for use. If the requested SIM 94 is available, in step 261 the SIM server 26 exclusively associates the requested SIM 94 with the requesting wireless communications client 16. For example, the SIM server 26 may establish a persistent communications session between the requested SIM 94 and the requesting wireless communications client 16. Additionally, or alternatively, the SIM server 26 may set a flag in the SIM 94 and/or identify the SIM 94 as being exclusively allocated or "not available" in a corresponding database which the SIM server 26 checks as part of step 258 and/or step 259 (discussed immediately below). The SIM server 26 may retain the exclusive association between the requested SIM 94 with the requesting wireless communications client 16 until the SIM server 16 receives a request to release or terminate the association, or until a "time-out" condition occurs.

If the requested SIM 94 is not available, the SIM server 26 sends an appropriate message to the requesting wireless communications device 16 and/or controller 32 indicating that the SIM 94 is not available for use in optional step 259, and then returns to the "Wait" state, monitoring the communications port in step 251.

If the requested SIM 94 is available, the method 250 passes control to step 260. In step 260, the SIM server exclusively associates the requested SIM 94 with the remote wireless communications device 100, an illustrated example of which is described below with reference to FIG. 9C.

Returning to step 257, if the SIM server 26 determines the requested SIM 94 is not accessible by the SIM server 26, the method 250 passes control to step 261, where the SIM server 26 determines whether the requested SIM 94 is accessible by other SIM servers 26 in a same SIM server group 30.

If the requested SIM 94 is accessible by another SIM server 26 in the same SIM server group 30, the SIM server 26 provides address information for the requested SIM 94 to the requesting remote wireless communications client 16 in step 262, and then returns control to step 252. If the requested SIM 94 is not accessible by other SIM servers 26 in the same SIM server group 30, the SIM server 26 sends a request to the SIM librarian system 34 in step 263.

In step 264, the SIM server 26 receives a response including an address from the SIM librarian 34. In step 265, the SIM server 26 returns the received address to the requesting remote wireless communications client 16, and returns to a waiting state at step 252.

Figure 9C:
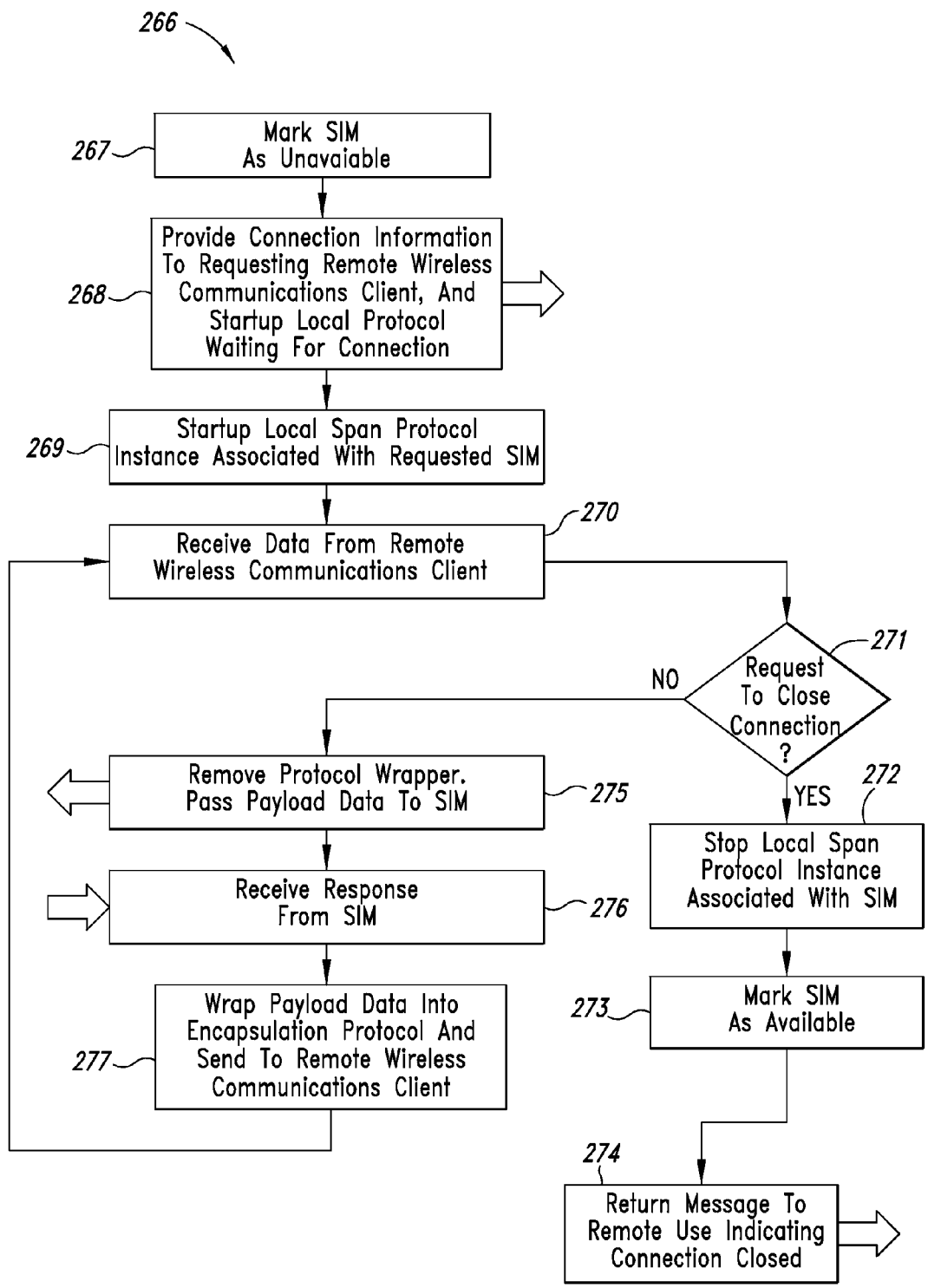
FIG. 9C is a flow diagram of an illustrated method of exclusively associating a requested SIM with a remote wireless communications client in accordance with the method of operating the SIM server illustrated in FIGS. 9A and 9B.

FIG. 9C shows an exemplary illustrated method 266 of exclusively associating the requested SIM 94 with the wireless communications device 100 of the requesting wireless communications client 16. The method 266 is suitable for realizing the step 260 of the method 250 (FIGS. 9A, 9B).

In step 267, the SIM server 26 exclusively reserves the SIM 94, for example marking the SIM 94 as being unavailable in an appropriate database or otherwise ensuring that the SIM 94 is not available for use by other requesters. In step 268, the SIM server 26 provides connection information to the requesting remote wireless communications client 16 and employs the SIM socket control 134 to start up a local protocol and waits for a connection. In step 269, the SIM server 26 starts the local span protocol instance (e.g., span encapsulation thread 134134d) associated with the requested SIM 94. In step 270, the SIM server 26 receives a communication from the remote wireless communications client 16. In step 271, the SIM server 26 determines whether the request corresponds to a request to release the SIM 94 or otherwise close the connection.

If the request is to release the SIM 94 or otherwise close the connection, in step 272 the SIM server 26 stops the local span protocol instance 134a-134d associated with the SIM 94. In step 273, the SIM server 26 then makes the SIM 94 available, for example, marking the SIM 94 as being available in the appropriate database. In step 274, the SIM server 26 returns a message to the remote wireless communications client 16 indicating that the connection has been closed and the exclusive association has been terminated.

If the SIM server 26 determines in step 271 that the request does not correspond to a request to release the SIM 94 or otherwise close the connection, in step 275 the SIM server 26 removes a protocol wrapper and passes the payload data of the request to the SIM 94. In step 276, the SIM server 26 receives a response from the SIM 94. In step 277, the SIM server 26 wraps the payload data (i.e., received response) into an encapsulation protocol and transmits the encapsulated payload data to the wireless communications device 100 of the wireless communications client 16. The method 266 then returns to step 270 for receipt of further communications from the wireless communications client 100. Typical SIMs 94 are not capable of initiating action, but rather can respond to requests to retrieve and/or store information or to perform other actions.

Figure 9D:
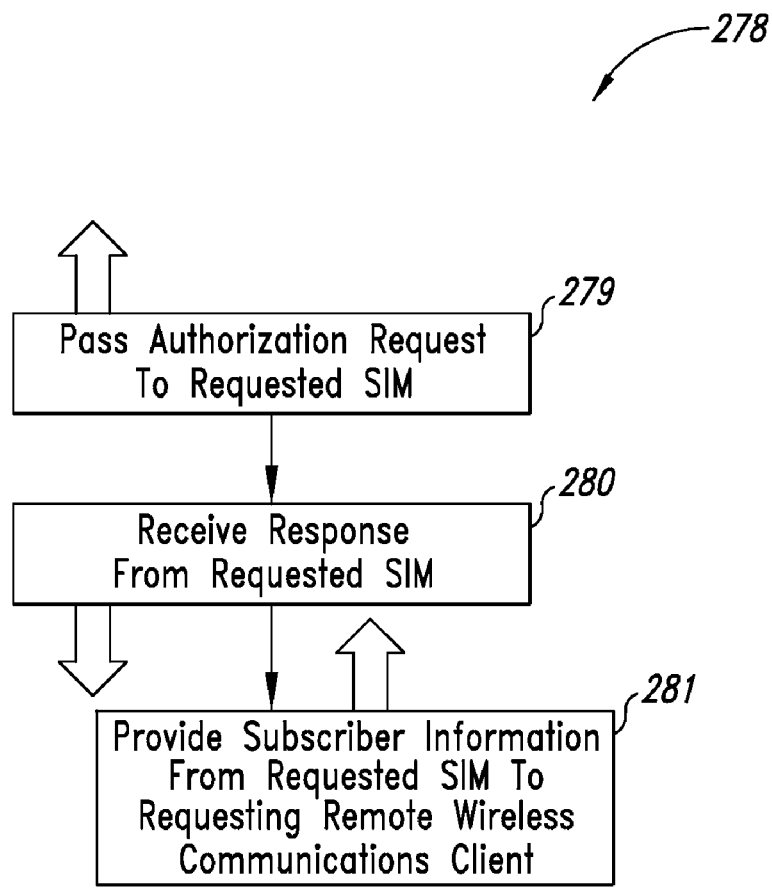
FIG. 9D is a flow diagram of an illustrated method of passing a challenge and response between wireless communications client and a SIM in accordance with the method of exclusively associating a requested SIM with a remote wireless communications client illustrated in FIG. 9C.

FIG. 9D shows an exemplary illustrated method 278 of passing an authorization challenge and response between a wireless communications device 100 of the wireless communications client 16 and a SIM 94, in accordance with the method 266 (FIG. 9C). In at least some embodiments, the SIM server 26 may be unaware of the contents of some or all of the requests or communications, and will simply be forwarding communications between the wireless communications device 100 and the SIM 94. Thus, the SIM server 26 may be unaware that it is transmitting an authorization challenge and response.

In step 279, the SIM server 26 passes an authorization request received via the wireless communications client 16 to the SIM 94. As discussed in the background, it is common for the MSC 20 or other portion of the wireless service provider system to periodically challenge the wireless communications device 100 for authentication. This prevents fraud, for example by preventing the simultaneous use of a subscriber identity by the swapping of a single SIM 94 between multiple wireless communications devices 100 after starting a call on each of the respective wireless devices 100. Under GSM, the challenge or authentication request includes a random number or seed, which the SIM 94 employs along with the secret key encoded in the SIM 94 to algorithmically create a response, commonly referred to as a "signed response"

In step 280, the SIM server 26 receives a response from the SIM 94. In step 281, the SIM server 26 provides subscriber information in the form of the response from the requested SIM 94 to the requesting remote wireless communications client 16.

Additionally, the SIM server 26 may cache certain data to decrease the time the SIM server 26 takes to respond to requests. For example, the SIM server 26 may be programmed to store the first response from a SIM 94 to each of a number of selected requests (e.g., SS7 messages or other communications) in a data cache. The requests may be selected by the stability of the response and/or the frequency with which the particular request occurs in typically transactions. Further, the SIM server 26 can be programmed to "learn" which requests/response combinations to cache by recognizing patterns of requests (e.g., SS7 messages) and responses, for example relying on the stability of the response and the frequency of the request during operation. Thus, the SIM server 26 does not even need to understand or know what is being requested, but simply must understand if the requested data is stable or changes over time. Where the caching is bi-directional (i.e., retrieval from, and storage to, the SIM 94), the SIM server 26 may also store a direction indication in the data cache. One skilled in the art will note that caching typically will not work for authorization challenges, since the correct response is dependent on a random number or seed provided with each authorization request. However, caching can significantly reduce response times for the retrieval and/or storage of other information, which may be particularly useful where a portion of the communications network 22 employs TCP/IP with its associated timing problems.

Figure 18:
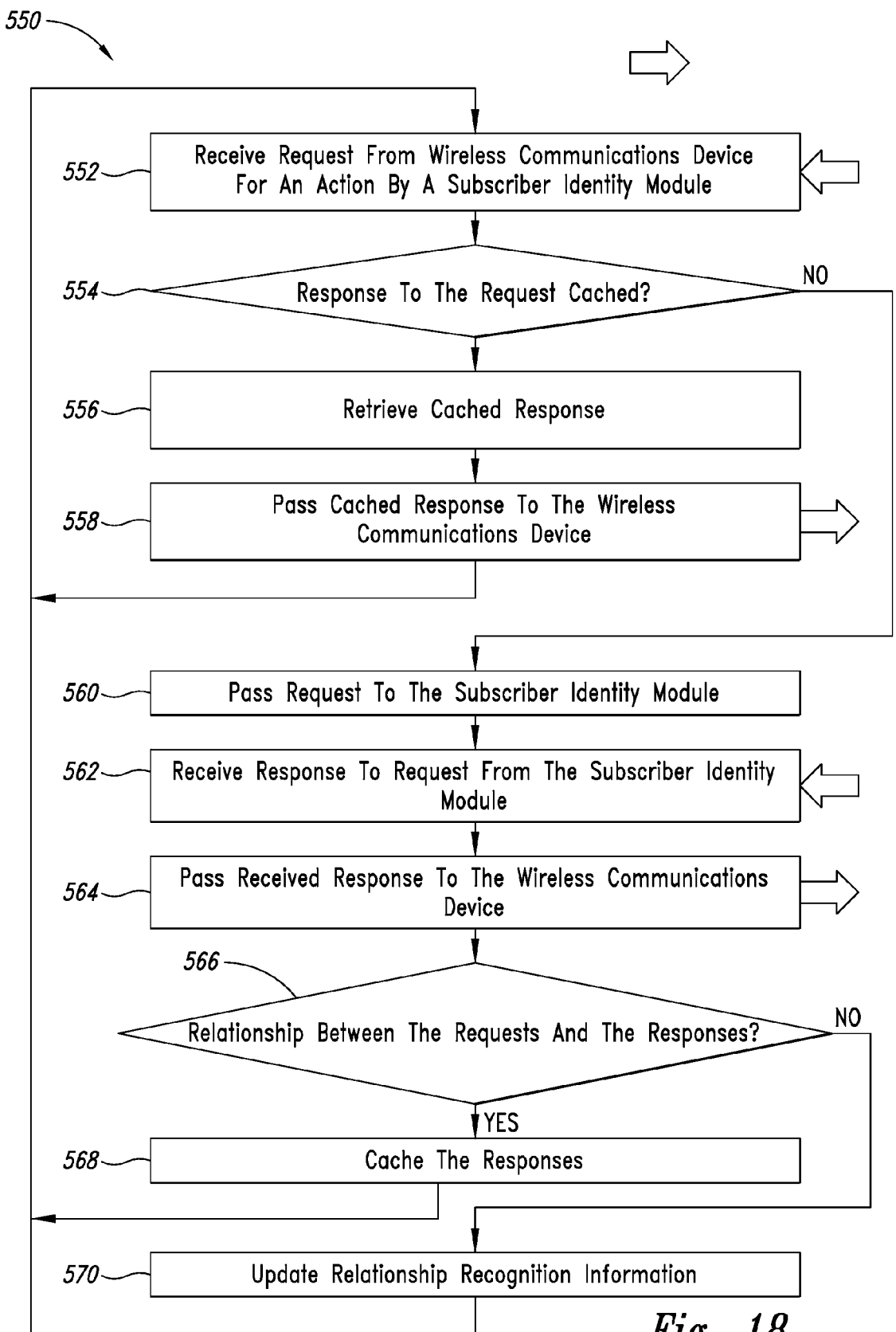
FIG. 18 is a flow diagram of a method of operating the SIM server employing caching of response to requests.

FIG. 18 shows one illustrated embodiment of a method 550 for operating the SIM sever 26 employing caching. The method 550 may be employed as part of, or as a substitute for, the method 250 of FIG. 9.

In step 552, the SIM server 26 receives a request for the SIM 94 from the wireless communications client 16. In step 554, the SIM server 26 determines whether a response to the request has been cached in the data cache. If the response to the request has been cached, in step 556 the SIM server 26 retrieves the cached response, passes the retrieved cached response to the wireless communications client in step 558, and returns to step 552. Thus, the SIM server can provide the response to the requester, either directly where the requester is the wireless communications client 16 or indirectly via the wireless communications client 16 where the requester is the MSC 20, without the delay associated with passing the request to the SIM 94 and waiting for a response from the SIM 94. This can provide significant saving in latency and response times.

If the response to the request has not been cached, in step 560 the SIM server 26 passes the request to the SIM 94. In step 562, the SIM server 26 receives a response from the SIM 94. In step 564, the SIM server 26 passes the response received from the SIM 94 to the wireless communications client 16.

In step 566, the SIM server 26 determines whether there is a relationship between the received response and the request. As discussed above, the SIM server 26 can determine whether the request of a type previously identified as being suitable for caching, or can analyze the stability of the response and/or frequency of the request in determining if a relationship exists. The SIM server may rely on a set of relationship recognition information which may include a list of requests suitable for caching, a tracking of the number of times a particular response has occurred for a given request, and/or a cumulative tally of the number of times or frequency that particular requests have occurred.

If the SIM server 26 determines that there is a relationship, the SIM server 26 caches the response in the data cache in step 568, and returns to step 552 to wait for the next request. As an alternative, the SIM server 26 may pass control to step 570 before returning to step 552.

If the SIM server 26 determines that there is a no relationship, the SIM server 26 updates a set of relationship recognition information in step 570 and returns to step 552 to wait for the next request.

Operating A SIM Librarian

Figure 10:
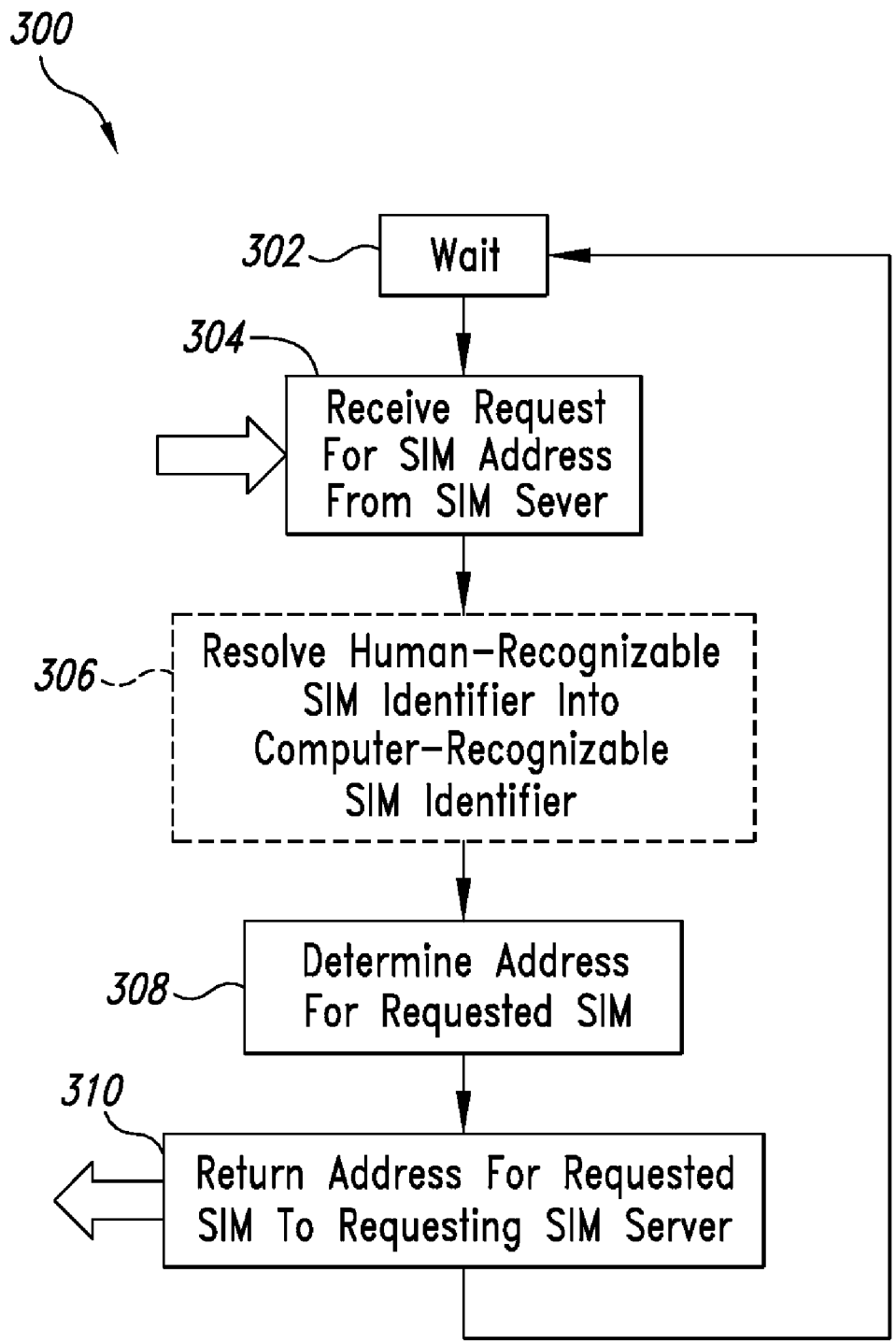
FIG. 10 is a flow diagram of an illustrated method of operating the SIM librarian of FIG. 1 to provide SIM location information.

FIG. 10 shows a method 300 of operating a SIM librarian computing system 34 according to one illustrated exemplary embodiment. In step 302, the SIM librarian computing system 34 waits for a request on a communications port. In step 304, the SIM librarian computing system 34 receives a request for SIM address from a SIM server 26. In step 306, the SIM librarian computing system 34 resolves the human-recognizable SIM identifier in the received request into a computer-recognizable SIM identifier. The human-recognizable SIM identifier can take any of a variety of forms such as a name of the SIM 94, group of SIMs 94, and/or characteristic of the SIM 94 (e.g., geographic location, home calling area, wireless communications service provider, phone type, etc.). In step 308, the SIM librarian computing system 34 determines an address for the requested SIM 94 based on the computer-recognizable SIM identifier. In step 310, the SIM librarian computing system 34 returns the determined address for the requested SIM 94 to the requesting SIM server 26. SIM librarian computing system 34 returns control to step 302, waiting for additional requests.

Maintaining A Persistent Name List

Figure 11:
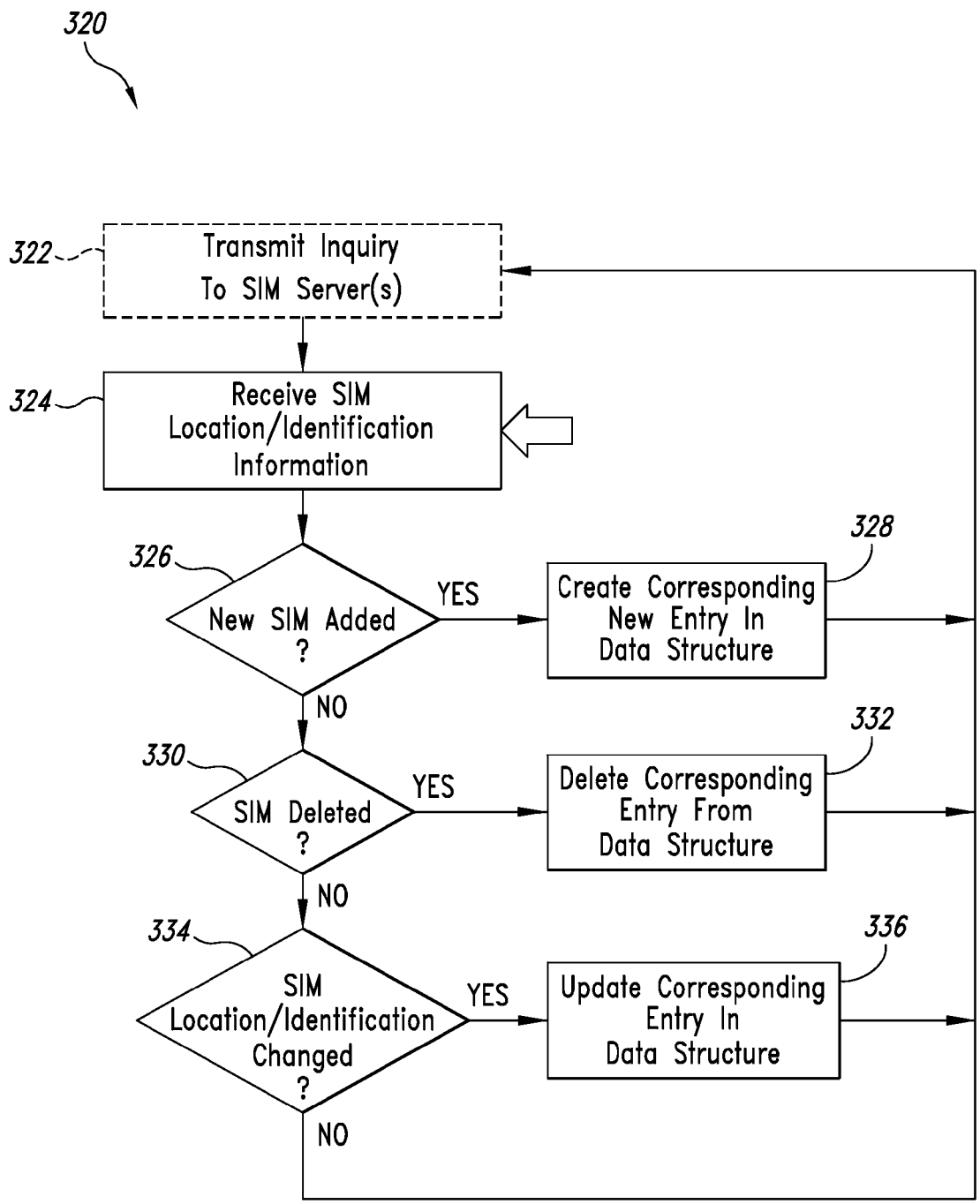
FIG. 11 is a flow diagram of an illustrated method of operating of the SIM librarian computing system of FIG. 1 to maintain SIM location/identification information.

FIG. 11 shows a method 320 of maintaining SIM information in a persistent name list storage 160 (FIG. 7) of the SIM librarian computing system 34 according to one illustrated exemplary embodiment.

In optional step 322, the SIM librarian computing system 34 transmits an inquiry to one or more of the SIM servers 26. In step 324, the SIM librarian computing system 34 receives SIM location and/or identification information from the SIM servers 26. In step 326, the SIM librarian system 34 determines whether the received SIM location/identification information identifies a new SIM being added to a SIM bank.

If a new SIM 94 is being added to a SIM bank 28, the SIM librarian computing system 34 creates a corresponding new entry in a data structure 338 (FIG. 12) stored in the persistent name list storage 160, and the method 320 returns control to step 322. Otherwise, the SIM librarian computing system 34 determines whether a SIM 94 is deleted or removed from one of the SIM banks 28 in step 330. If a SIM 94 is being deleted or removed, the SIM librarian computing system 34 deletes a corresponding entry from the data structure 338 (FIG. 12) stored in the persistent name list storage 160 in step 332, the method 320 then returning control to step 322. If a SIM 94 is not being deleted, the SIM librarian computing system 34 determines whether the SIM location/identification information for a SIM has changed in step 334.

If the SIM location/identification information has changed, the SIM librarian computing system 34 updates a corresponding entry in the data structure 338 (FIG. 12) and the persistent name list storage 160 in step 336, the method 320 then returning control to step 322. Otherwise the method 320 passed control directly to step 322. Typically the location or human-recognizable identification information may change, while the unique SIM identifier will remain unchanged.

Data Structure For SIM Information

Figure 12:
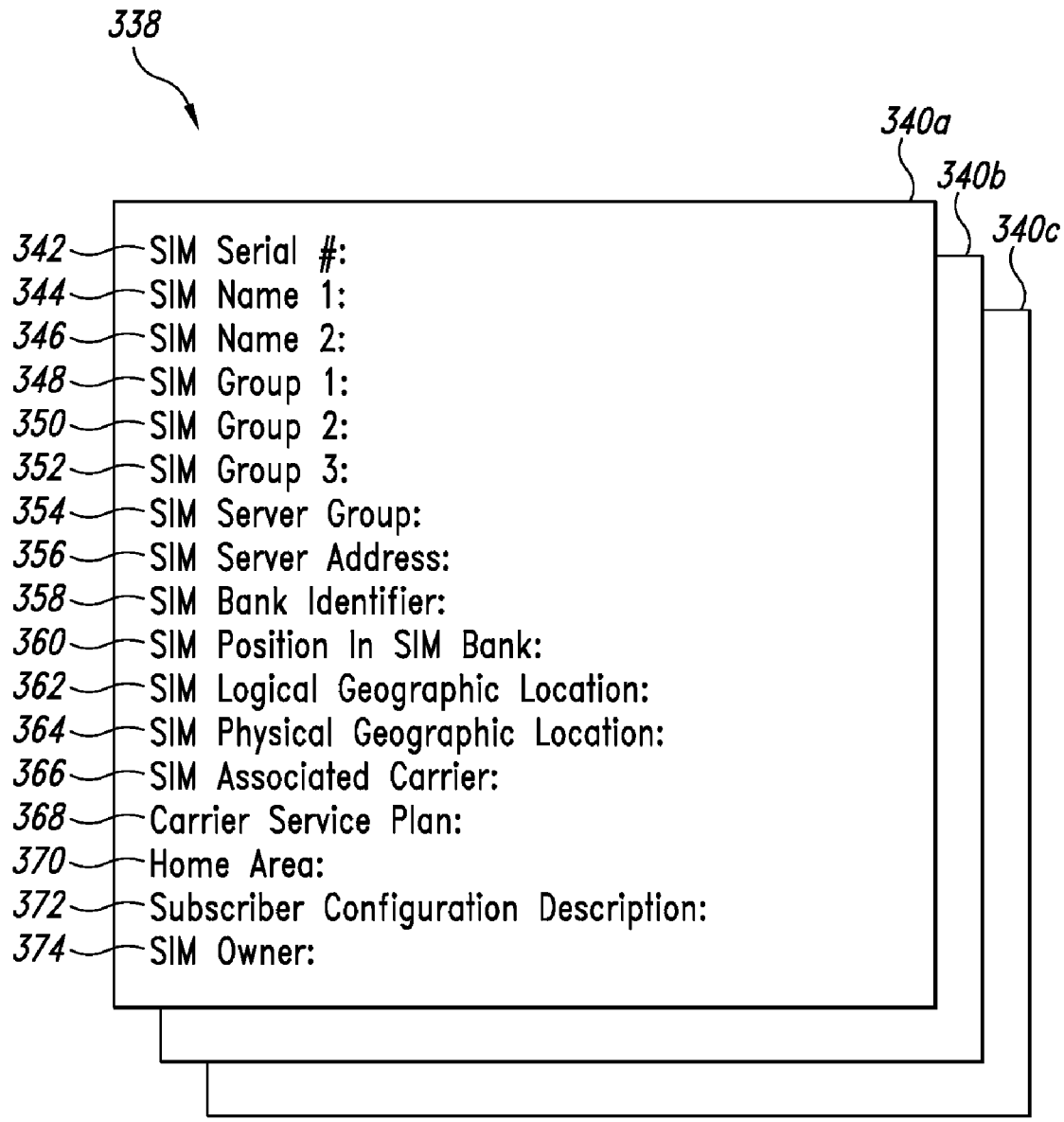
FIG. 12 is a schematic diagram of a data structure for storing SIM location/identification information including an number of records each having a number of fields.

FIG. 12 shows a data structure 338 including a number of records, collectively referenced as 340 and individually referenced as 340a-340c, for storing SIM location/identification information in the persistent name list storage 160 (FIG. 7) of the SIM librarian computing system 34. Each record 340 includes a number of fields, for storing information about the SIM 94 including human-recognizable information to simplify the task of SIM selection. The fields represented in FIG. 12 are exemplary, and the records 340 may include a greater or a lesser number of fields, and/or other fields.

A "SIM serial number" field 342 stores a SIM serial number for uniquely identifying the SIM 94. A number of "SIM name" fields 344, 346 store human-recognizable names for the SIMs. There may be a less or greater number of "SIM name" fields, although only two are shown. The SIMs 94 may be randomly assigned names, or given names based on some property of the SIM such as physical location of the SIM 94 or of the home calling area associated with the SIM 94.

A number of "SIM group" fields 348, 350, 352 store group identifiers which identify one or more groups to which the SIM 94 belongs. Grouping of SIMs 94 allows easy access to SIMs 94 with similar characteristics or usefulness. A "SIM server group" field 354 stores an identifier of a SIM server group 30 to which the SIM 94 is associated by way of being received in a SIM bank 28 associated with one of the SIM servers 26 that belong to the SIM server group 30. A "SIM server address" field 356 stores a computer-routable address for the SIM server 26 to which the SIM 94 is associated. A "SIM bank identifier" field 358 stores a computer-routable address, such as a port number, of the SIM bank 28 in which the SIM 94 is received. The "SIM position" field 360 stores a computer-routable address, such as a slot number, corresponding to a position 92 of the SIM bank 28 in which the SIM 94 is received.

A "SIM logical geographic location" field 362 stores an indication of a logical geographic location for the SIM 94. A "SIM physical geographic location" field 364 stores an indication of a physical geographic location of the SIM 94, for example a city in which the SIM bank is located. A "SIM associated carrier" field 366 stores an identification of a wireless communications provider or carrier with which the SIM 94 is associated. For example the SIM 94 may be associated with a particular wireless service provider. A "carrier service plan" field 368 stores an indication of the particular carrier service plan with which the SIM 94 is associated. For example the SIM 94 may be associated with a particular unlimited long distance plan of a particular carrier.

A "home area" field 370 includes an indication of a particular home calling area with which the SIM 94 is associated. Home calling areas are common in cellular calling plans. A "subscriber configuration" description field 372 includes a description of various configuration parameters for the wireless communications device 16 which are preprogrammed into the SIM 94. For example, the SIM 94 may store a list of frequently used telephone numbers which are automatically programmed in the wireless communications device 16 when associated with a particular SIM 94, a font for use in a display menu, or a notification setting such as ring, vibrate or ring and vibrate.

A "SIM owner" field 374 may identify a person or entity that owns the SIM 94. For example, the owner could be one of a number of billing entities such as a company, or a department within a company, which may be particularly useful to the SIM accounting computing system 36 (FIG. 1). The "SIM owner" field 374 allows an operator to elect to employ SIMs 94 that the operator owns, before relying on SIMs 94 for which the operator would have to receive permission and/or pay a fee to use.

Operating SIM Accounting System

Figure 13A:
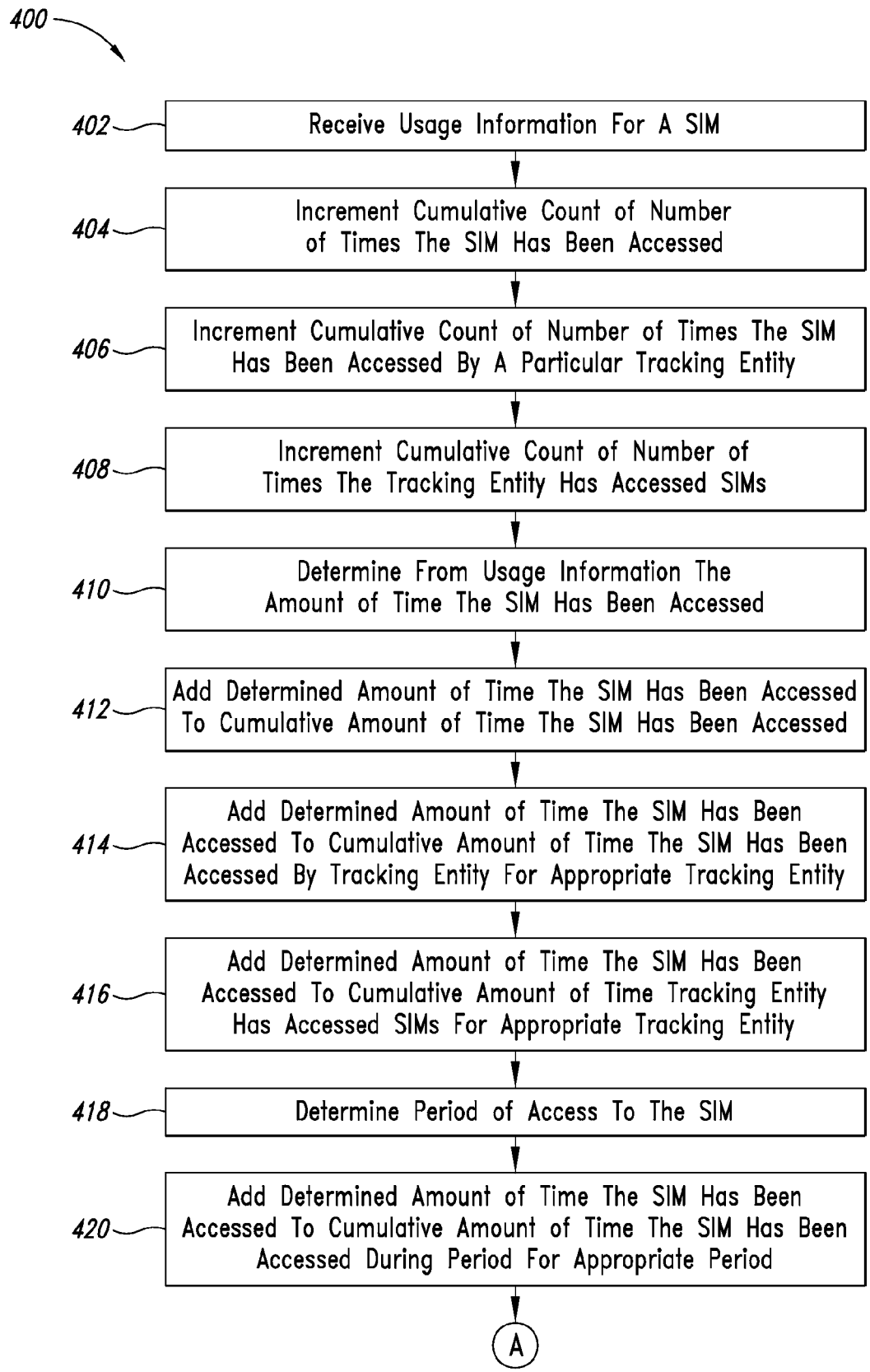
FIGS. 13A and 13B are a flow diagram of an illustrated method of operating the SIM accounting computing system of FIG. 1.
Figure 13B:
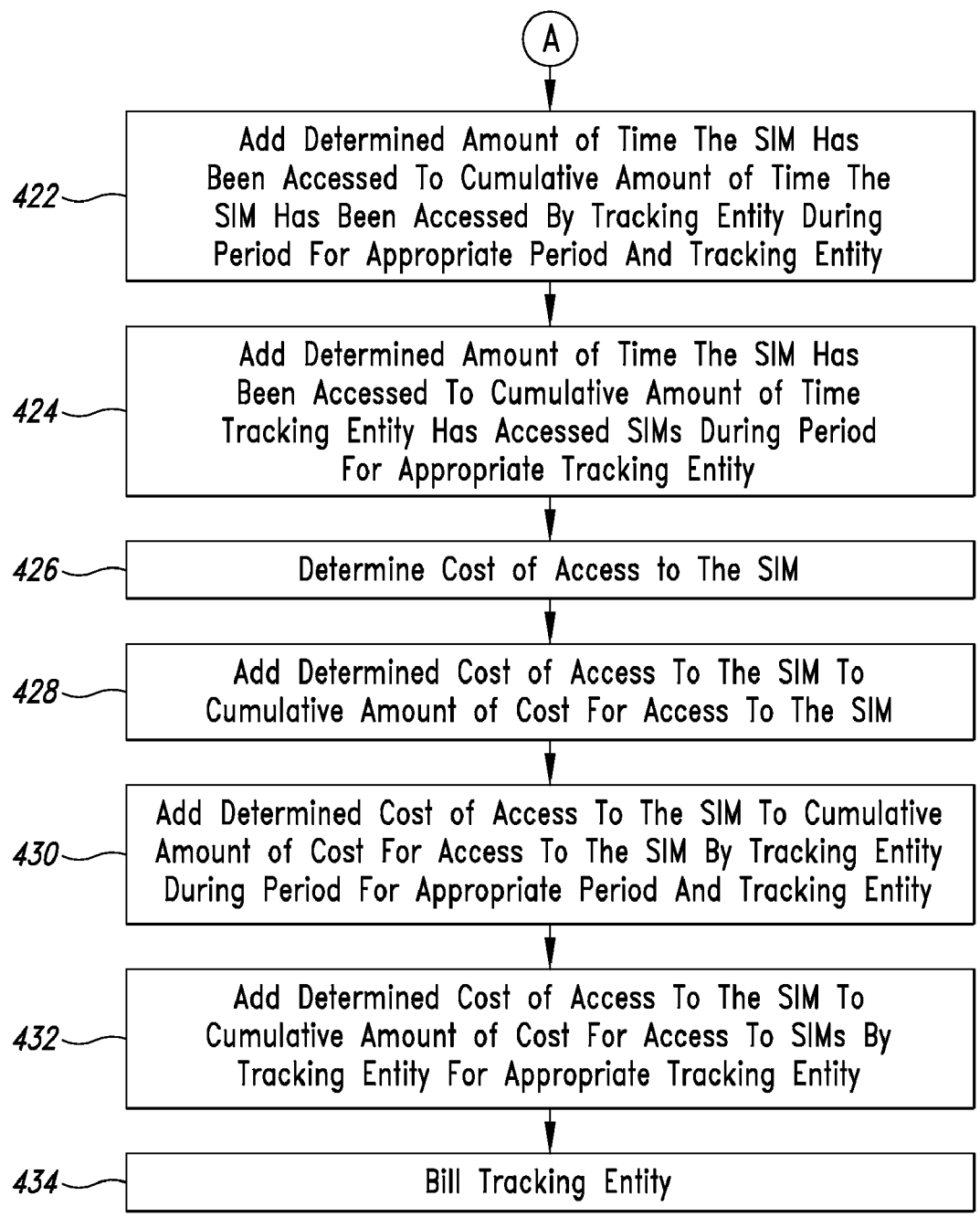

FIGS. 13A and 13B show a method 400 of accounting for SIM usage according to one illustrated exemplary embodiment. Most of the steps in the method 400 are optional, and are dependent upon the particular information that interests an operator of the SIM remote access system 24. Additionally, many of the steps can be executed in a different order, and additional steps may be added to the method 400.

In step 402, the SIM accounting computing system 36 (FIG. 1) receives usage information for a SIM 94, for example from the SIM server 26 with which the SIM 94 is associated and/or from a wireless communications client 16 requesting or using the SIM 94. In step 404, SIM accounting computing system 36 increments a cumulative count of the number of times that the SIM 94 has been accessed. In step 406, the SIM accounting computing system 36 increments a cumulative count of the number of times that the SIM 94 has been accessed by a particular billing entity. In step 408, the SIM accounting computing system 36 increments a cumulative count of the number of times the billing entity has accessed any of the SIMs 94 available via the SIM remote access system 24.

In step 410, the SIM accounting computing system 36 determines from the received SIM usage information the amount of time that the SIM 94 has been accessed. In step 412, the SIM accounting computing system 36 adds the determined amount of time that the SIM 94 has been accessed to a cumulative amount of time that the SIM 94 has been accessed. In step 414, the SIM accounting computing system 36 adds the determined amount of time that the SIM 94 has been accessed to a cumulative amount of time that the SIM 94 has been accessed by a billing entity for the appropriate billing entity. This permits the SIM accounting computing system 36 to track the total amount of usage of a particular SIM 94 by a particular billing entity. In step 416, the SIM accounting computing system 36 adds the determined amount of time that the SIM 94 has been accessed to a cumulative amount of time that the billing entity has accessed all SIMs 94 for the appropriate billing entity.

In step 418, the SIM accounting computing system 36 determines the period of access to the SIM 94. For example, a day may be divided into different periods which may have different accounting aspects, for example different rates dependent upon predicted demand for the period. In a similar fashion a week, month or year may be divided into different periods, for example weekend SIM usage may be associated with a lower rate than weekday SIM usage.

In step 420, the SIM accounting computing system 36 adds the determined amount of time that the SIM 94 has been accessed to a cumulative amount of time that the SIM 94 has been accessed during the period for the appropriate period. In step 422, the SIM accounting computing system 36 adds the determined amount of time that the SIM 94 has been accessed to a cumulative amount of time that the SIM 94 has been accessed by the billing entity during the period for the appropriate period and billing entity. This allows the SIM accounting computing system 36 to track a billing entities usage of a SIM 94 by period, which may be particularly suitable for some billing scenarios. In step 424, the SIM accounting computing system 36 adds the determined amount of time the SIM 94 has been accessed to a cumulative amount of time the billing entity has accessed all SIMs during the period for the appropriate billing entity.

In step 426, the SIM accounting computing system 36 determines the cost of access to the SIM 94. In step 428, the SIM accounting computing system 36 adds the determined cost of access to the SIM 94 to a cumulative amount of cost for access to the SIM 94. In step 430, the SIM accounting computing system adds the determined cost of access to the SIM 94 to a cumulative amount of cost for access to the SIM 94 by a particular billing entity during the period for an appropriate period and billing entity. In step 432, the SIM accounting computing system 36 adds the determined cost of access to the SIM 94 to a cumulative amount of cost for access to all SIMs 94 by the billing entity for the appropriate billing entity. In step 434 the SIM accounting computing system 36 bills the billing entity for the billing entities SIM usage during the billing period.

Figure 14:
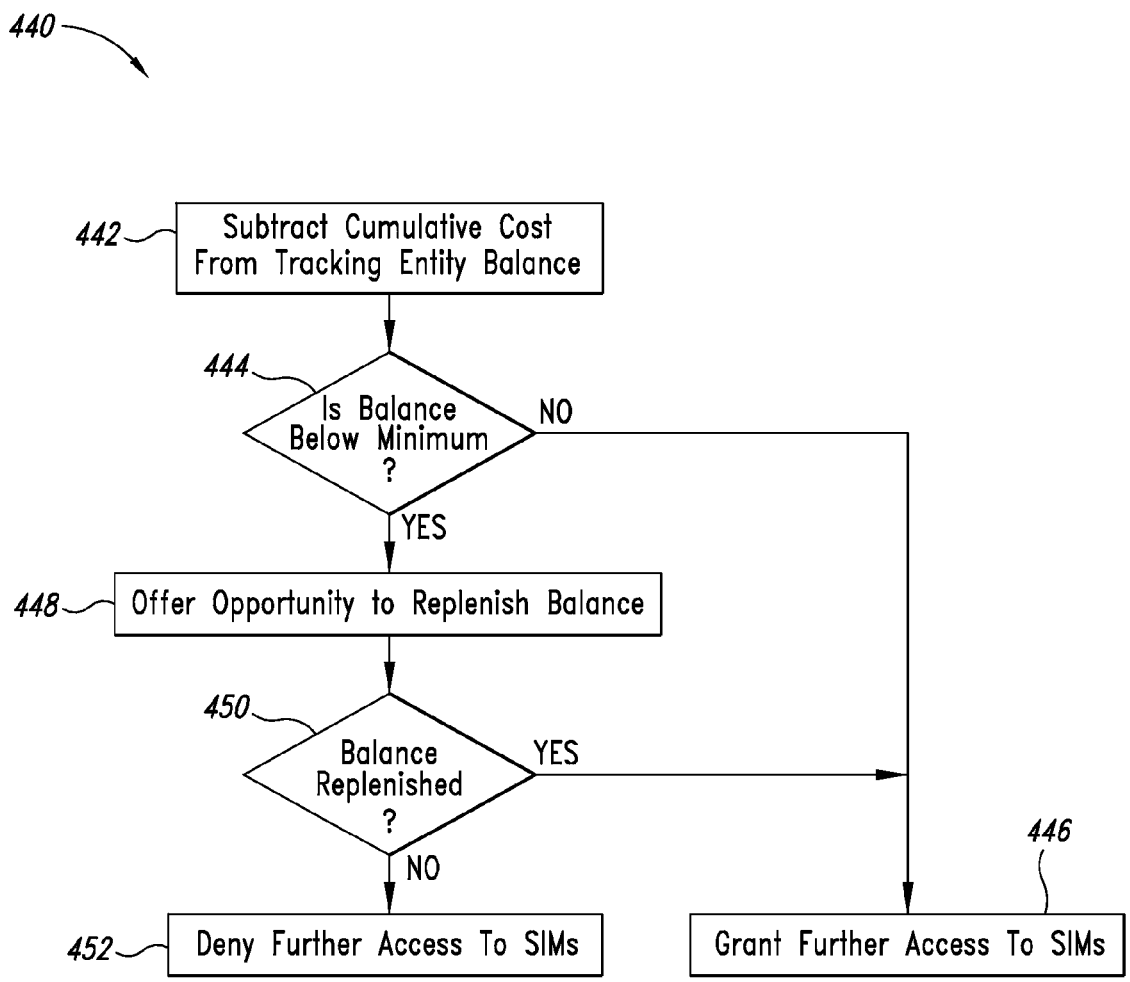
FIG. 14 is a flow diagram of an alternative illustrated method of operating the SIM accounting computing system of FIG. 1.

FIG. 14 shows a method 440 of accounting for SIM usage which may be employed in addition to, or in substitution to, step 434 of FIGS. 13A, 13B.

In step 442, the SIM accounting computing system 36 subtracts the cumulative cost from a billing entity balance that represents a sum of funds on account for the billing entity or a credit to an billing entity account. For example, the billing entity may receive a set balance in its accounts for a regular monthly payment. Usage exceeding the allocated amount may be billed by time, for example, by each whole minute, rounded up. While the account balance is discussed in terms of cost, one skilled in the art will recognize that the cost and accounts can just as easily be represented in terms of time or number of uses.

In step 444, the SIM accounting computing system 36 determines if the balance is below some set minimum balance. If the balance is not below the set minimum balance, the SIM accounting computing system 36 grants further access to SIMs in step 446. If the balance is below the minimum access, the SIM accounting computing system 36 may optionally offer an opportunity to replenish the balance in step 448. For example, the SIM computing accounting system 36 may allow a user (e.g., billing entity) to enter a charge account number, or prepaid card number to replenish the balance of the account.

In step 450, the SIM accounting computing system 36 determines if the balance is replenished. If the balance has been replenished, the SIM accounting computing system 36 grants further access to the SIMs 94 in step 446. If the balance has not been replenished, the SIM accounting computing system 36 denies further access to the SIMs 94 in step 452.

Wireless Communications Device Server

Figure 15:
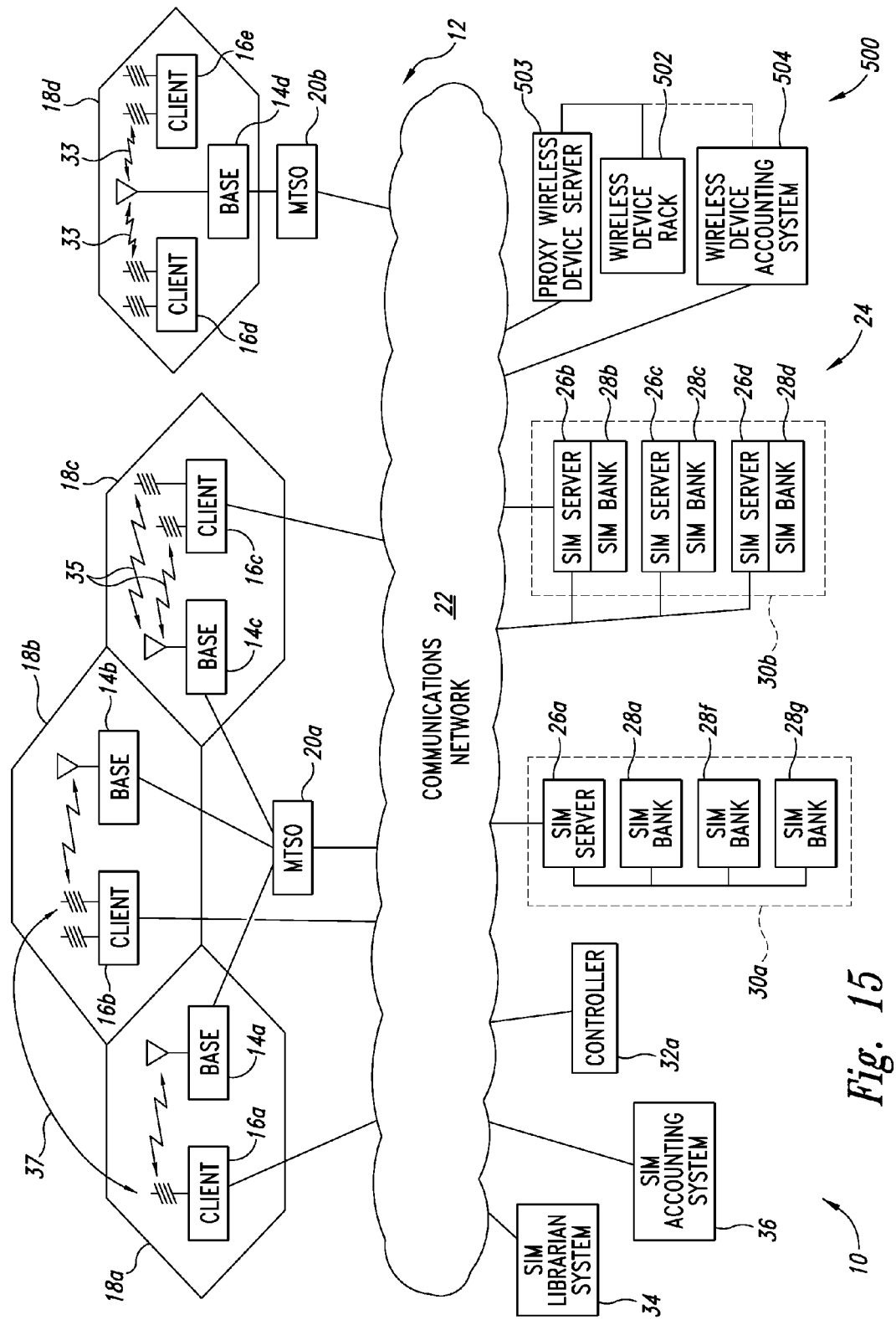
FIG. 15 is a schematic diagram of a remote wireless device access system in use with the remote SIM access system of FIG. 1, the remote wireless device access system having a rack including a number of proxy wireless communications devices.

FIG. 15 shows a wireless communications device remote access system 500, in use with the remote SIM access system 24 of FIG. 1. The wireless communications device remote access system 500 includes a wireless communications device rack 502 having a number of positions for receiving proxy wireless communications devices and a proxy wireless device server 503 capable of communicatively coupling proxy wireless communications devices received in the rack 502 to controllers 32, controlling wireless communications clients 16, and/or controlling wireless communications devices 100 (FIG. 4). The wireless communications device remote access system 500 can also include a wireless device usage accounting computing system 504 and/or a wireless device librarian system (not shown).

Figure 16:
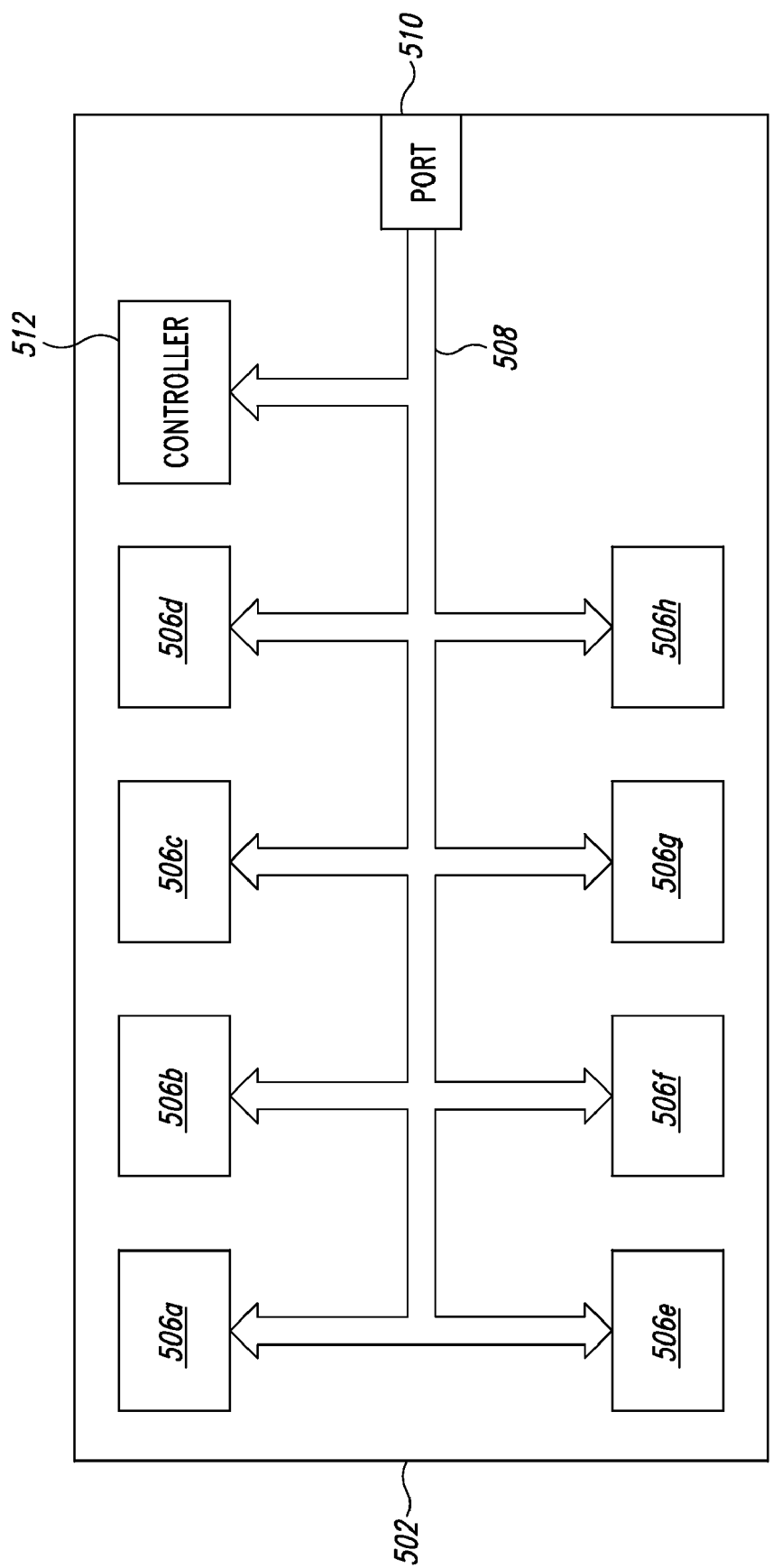
FIG. 16 is a schematic diagram of the rack of wireless communications devices for use in the remote wireless communications device access system of FIG. 15.

FIG. 16 shows the wireless communications device rack 502 containing the number of proxy wireless communications devices, for example wireless PDAs, collectively referenced as 506 and individually referenced as 506a-506h. As used herein and in the claims, the term proxy refers to a device that may act as a servant or agent of another device, for example being remotely controlled by the other device. The rack 502 includes a bus 508 coupling the wireless PDAs 506 to a communications port 510, and a controller such as a micro-controller 512 for controlling the bus 510 and/or the PDAs 506.

The rack 502 may be associated with one or more proxy wireless device servers 503 at a local or a central location to form the wireless communications device remote access system 500. The proxy wireless device servers 503 can be configured to selectively couple a wireless PDA 506 to a remote controlling device such as a controller 32 or a controlling wireless communications client 16 such as the remote test platform 16c, by way of the communications network 22.

This allows the wireless PDA 506, or other wireless communications device, to be operated as if it were present at the remote site 18c where the remote test platform 16c is located. Thus, for example, a wireless device manufacturer or wireless service provider can verify that a wireless communications device 506 is operable in a given location 18c, for example, before releasing the wireless communications device 506 for sale. This testing may be instead of, or in addition to, the previously discussed testing of switching in the remote locations 18.

Additionally, or alternatively, this arrangement can allow an end user at a remote location 18a to use a wireless communications device 506 of their choice without actually owning the wireless communications device 506. For example, an end user may rent or lease use of a wireless PDA 506, which is accessed via the end user's cellular phone 16a or other controlling wireless communications device. The end user may select any available wireless communications device 506 in the rack 502, or an available wireless communications device 506 may be automatically assigned to the user, for example, upon connection. Thus the remote test platform 16c, or other controlling wireless device, acts like the wireless PDA at the remote location, downloading files, moving data, playing games, executing networking operations and/or reporting results.

Usage and billing may be maintained by the wireless communications device accounting system 504 in a similar fashion to that of the SIM accounting computing system 36 (FIG. 1) previously discussed. While illustrated in use with the SIM remote access system 24, the wireless device remote access system 500 can operate independently thereof where remote access to SIMs 94 (FIG. 3) is not required. Additionally, a wireless device librarian (not shown) can operate in a similar manner to the SIM librarian 34 previously discussed, tracking the location of various proxy wireless communications devices 506 and allowing the location of proxy wireless communications devices 506 using human-recognizable identifiers such as names.

Figure 17:
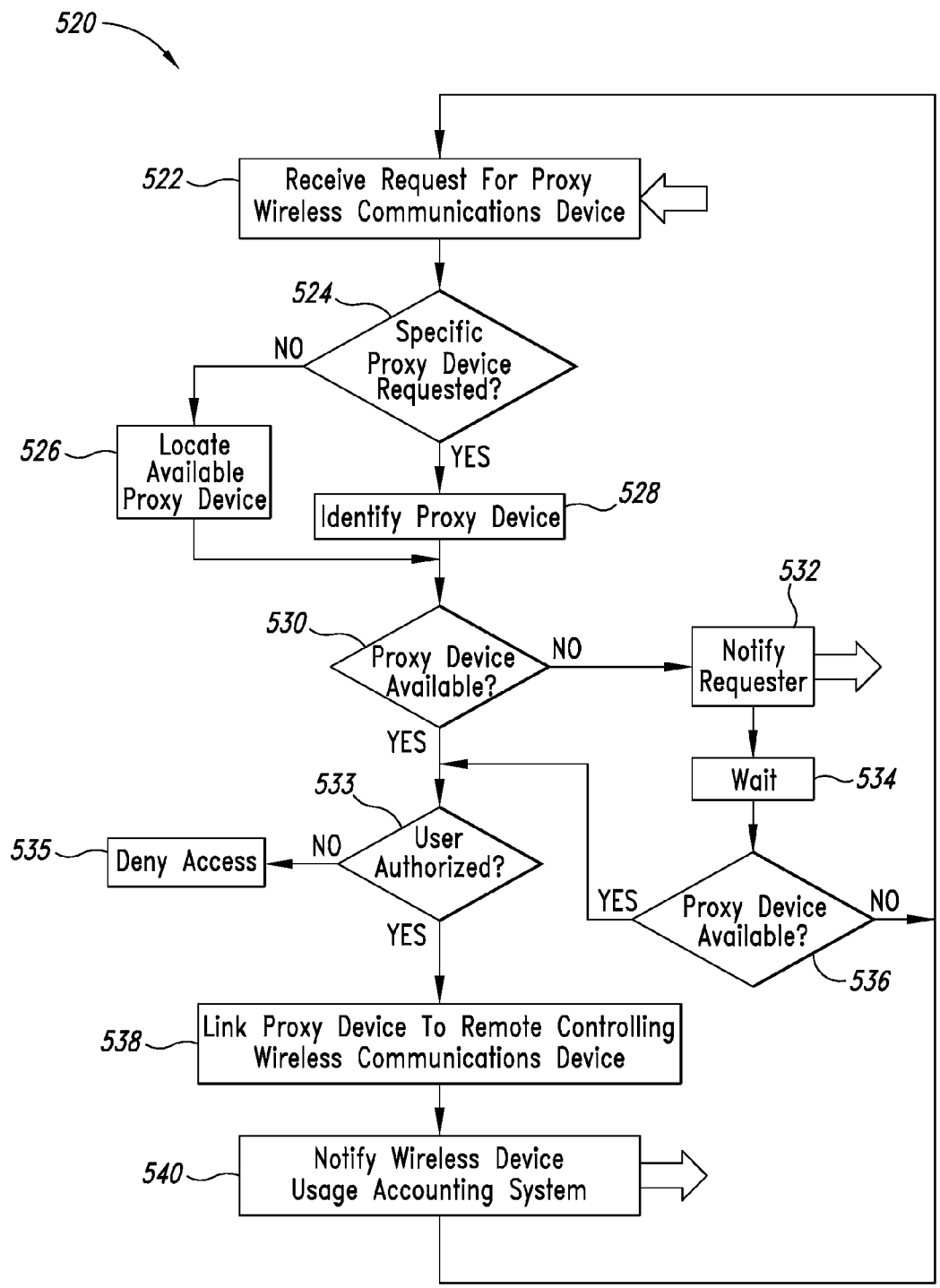
FIG. 17 is a flow diagram of a method of operating the alternative embodiment of FIG. 15.

FIG. 17 shows a method 520 operating the wireless communications device remote access system 500 of according to one illustrated embodiment.

In step 522, the wireless communications device server 503 receives a request for remote access to a proxy wireless communications device 506. The request may originate from an operator of the controller 32a, from an automatically executed script on the controller 32a, or from another source, such as one of the wireless communications clients 16.

In step 524, the wireless communications device server 503 or the micro-controller 512 determines if the request was for a specific proxy wireless communications device 506. If the request is not for a specific proxy wireless communications device 506, in step 526 the wireless communications device server 503 or the micro-controller 512 locates an available proxy wireless communications device 506 in the rack 502. If the request is for a specific proxy wireless communications device 506 or for a proxy wireless communications device having one or more specific characteristics (e.g., device type, user configuration, etc.), in step 528 the wireless communications device server 503 or the micro-controller 512 identifies a suitable proxy wireless communications device 506 in the rack 502.

In step 530, the wireless communications device server 503 or the micro-controller 512 determines whether the proxy wireless communications device 506 is available for use. If the proxy wireless communications device 506 is not available, the wireless communications device server 503 or the micro-controller 512 notifies the requester of the unavailability in step 532. The wireless communications device server 503 or then micro-controller 512 may wait a determined period of time in step 534, rechecking the availability one or more times before notifying the requester. Alternatively, or additionally, the wireless communications device server 503 or the micro-controller 512 may notify the requester in step 534 and then monitor the availability of desired proxy wireless communications device 506 in step 536, automatically notifying the requester and/or automatically linking the proxy wireless communications device 506 to a remote controlling wireless communications client 16 in step 538 when the proxy wireless communications device 506 becomes available.

If the proxy wireless communications device 506 is available (either from step 530 or step 536), the wireless communications device server 503 or the micro-controller 512 determines whether the requester is authorized to use the proxy wireless communications device 506 in step 533. Authorization may include verification of one or more of a user identifier, password, requesting device identifier, level of privilege, account balance, etc. The verification can be similar to that discussed above with respect to authorization of SIM usage.

If the requester is not authorized, the wireless communications device server 503 or the micro-controller 512 deny access to the proxy wireless communications device 506 in step 535. If the requester is authorized, the wireless communications device server 503 or the micro-controller 512 links the proxy wireless communications device 506 to a remote controlling wireless communications client 16 in step 540.

Remote Access Wired Access

Figure 19:
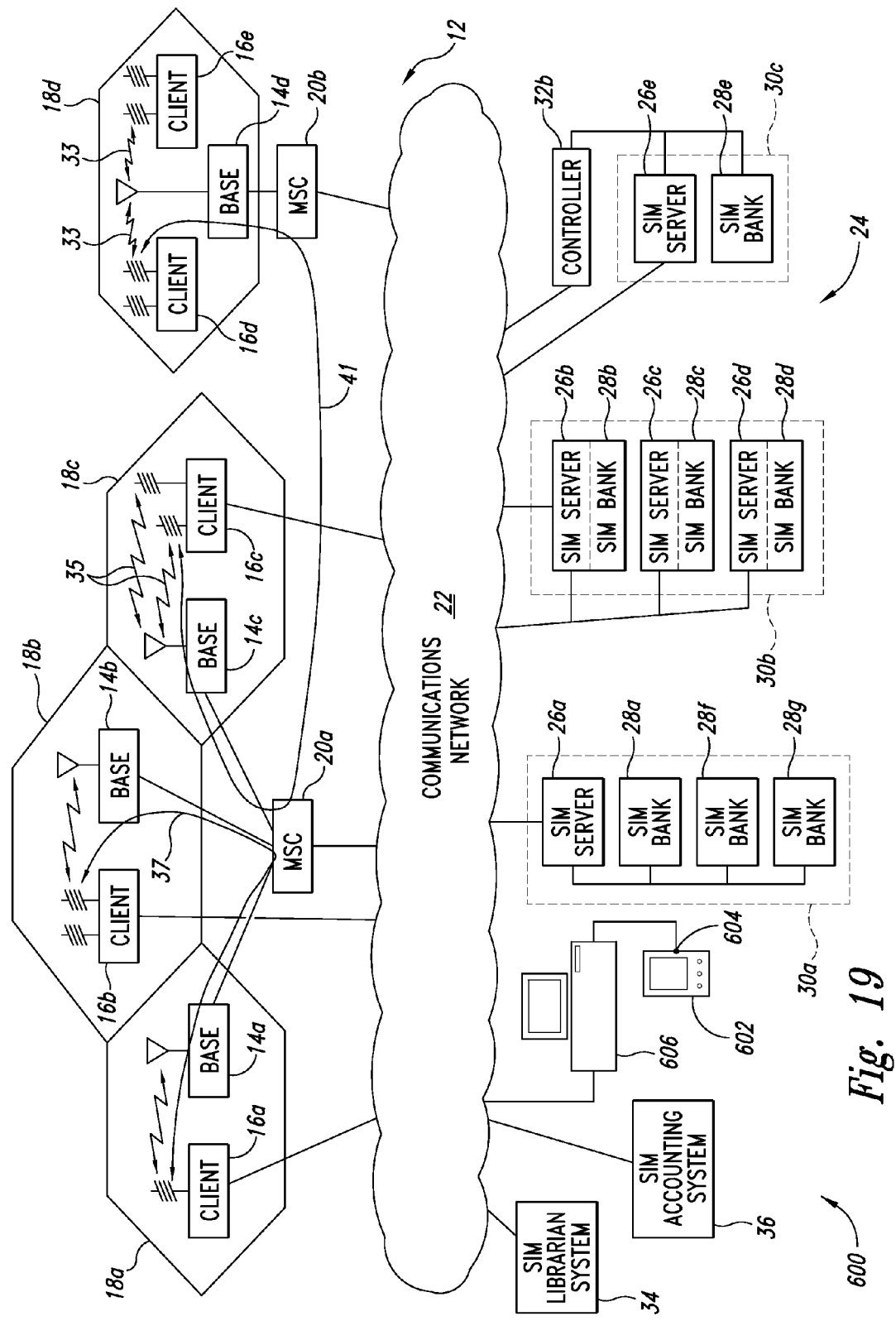
FIG. 19 is a schematic diagram of a remote access system to provide remote access to communications devices.

FIG. 19 shows an illustrated embodiment of a remote access system 600, that can provide remote access for communication devices without wireless functionality such as conventional PDAs 602. The system 600 may also provide remote access for communication devices that have wireless functionality without making use of that functionality, or making use of limited wireless functionality such as infrared communications.

The PDA 602 typically includes a communications port 604, for example an RS232 port, for providing bi-directional communications. The PDA 602 is coupled to a networking device such as a computer 606, to provide networked communications via the communications network 22. The computer 606 may take the form of a conventional networked PC. The coupling may take the form of a cable or limited range communications device such as an infrared transceivers or short range wireless transceiver. A computer 606 appropriately configured for the desired protocol and security can provide access to any of the wireless communications devices 100 of the wireless communications clients 16. Thus, a user at one location may operate the PDA 602 as if the PDA 602 was physically present at another location, for example, the physical location of the wireless communications client 16. Additionally, the wireless communications client 16 may be associated with a SIM 94 located at a third physical location.

The connection between the PDA 604 and the computer 606 can be made in the conventional fashion. The PC 606 simply makes the network connection to the desired wireless communications client 16, automatically providing the appropriate protocol to the communications including any required handshaking and/or security.

Further Variations

The above description sets out a SIM remote access system and a wireless device remote access system, and methods for each. Although specific embodiments of, and examples for, the invention are described herein for illustrative purposes, various equivalent modifications can be made without departing from the spirit and scope of the invention, as will be recognized by those skilled in the relevant art.

The teachings provided herein of the invention can be applied to other remote access systems, not necessarily the SIM remote access system 24 and wireless communications device remote access system 500 generally described above. For example, the SIM remote access system 24 and/or and wireless communications device remote access system 500 may include a greater or less number of computing systems, for example eliminating the SIM accounting computing system 36 and/or the SIM librarian computing system 34. The SIM accounting system 24 and/or and wireless communications device remote access system 500 can include a greater or less number of remote communications clients 16. While illustrated in FIG. 12 as a set of records 340 having fields, the data structure 338 can take a variety of other forms commonly employed in the computing arts, including but not limited to one or more linked lists, lookup tables or the like. Additionally, many of the methods include optional acts or steps, and may include additional act or steps, or perform the steps in a different order, as will be recognized by those skilled in the relevant arts.

The SIM remote access system 24 and/or wireless communications device remote access system 500 can have a different organization than the illustrated embodiment, combining some functions and/or eliminating some functions. The system 24 can employ some of the disclosed automated components for some functions, while relying on manual methods for other functions. The system can be more centralized, or more distributed, as is suitable for the particular communications environment.

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet are incorporated herein by reference in their entirety, including but not limited to commonly assigned U.S. provisional patent application Ser. No. 60/379,603, entitled "METHOD, APPARATUS AND ARTICLE TO REMOTELY ASSOCIATE WIRELESS COMMUNICATIONS DEVICES WITH SUBSCRIBER IDENTITIES AND/OR PROXY WIRELESS COMMUNICATIONS DEVICES," filed May 9, 2002; and U.S. application Ser. No. 10/194,417, entitled "METHOD, APPARATUS AND ARTICLE TO REMOTELY ASSOCIATE WIRELESS COMMUNICATIONS DEVICES WITH SUBSCRIBER IDENTITIES AND/OR PROXY WIRELESS COMMUNICATIONS DEVICES," filed Jul. 11, 2002. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all SIM remote access systems and methods that operate in accordance with the claims. Accordingly, the invention is not limited by the disclosure, but instead its scope is to be determined entirely by the following claims.

The invention claimed is:

1. A system to remotely operate wireless telecommunications devices, the system comprising:
    a first subscriber identity module bank that is a discrete component remotely located from the wireless telecommunications device and having a first plurality of subscriber identity module receiving positions, wherein a first number of the first plurality of subscriber identity module receiving positions has a respective subscriber identity module of a first number of subscriber identity modules physically received thereat, wherein each respective subscriber identity module of the first number of subscriber identity modules has a respective logical address associated therewith;
    a second subscriber identity module bank that is a further discrete component remotely located from the wireless telecommunications device and having a second plurality of subscriber identity module receiving positions, wherein a second number of the second plurality of subscriber identity module receiving positions has a respective subscriber identity module of a second number of subscriber identity modules physically received thereat, wherein each respective subscriber identity module of the second number of subscriber identity modules has a respective logical address associated therewith;
    a first subscriber identity module server associated with the first subscriber identity module bank discretely and remotely located from the wireless telecommunications device and responsive to requests to provide subscriber identity information from the first number of subscriber identity modules physically received at the first number of subscriber identity module receiving positions of the associated first subscriber identity module bank, the first subscriber identity module server including a computer-readable medium storing the associated logical address for each respective subscriber identity module of the first number of subscriber identity modules received at subscriber identity module receiving positions of the first subscriber identity module bank and the associated logical address for each respective subscriber identity module of the second number of subscriber identity modules received at subscriber identity module receiving positions of the second subscriber identity module bank; and
    a second subscriber identity module server associated with the second subscriber identity module bank discretely and remotely located from the wireless telecommunications device and responsive to requests to provide subscriber identity information from the second number of subscriber identity modules physically received at the second number of subscriber identity module receiving positions of the associated second subscriber identity module bank, the second subscriber identity server including a computer-readable medium storing the associated logical address for each respective subscriber identity module of the first number of subscriber identity modules received at subscriber identity module receiving positions of the first subscriber identity module bank and the associated logical address for each respective subscriber identity module of the second number of subscriber identity modules received at subscriber identity module receiving positions of the second subscriber identity module bank.

2. The system of claim 1 wherein the computer-readable medium of the first subscriber identity module server is encoded with instructions capable of being executed by the first subscriber identity module server to provide a first set of subscriber identity information from a first subscriber identity module of the first number of subscriber identity modules received at the first subscriber identity module bank in response to a first request corresponding to the first set of subscriber identity information received by the first subscriber identity module server, and wherein the computer-readable medium of the second subscriber identity module server is encoded with instructions capable of being executed by the first subscriber identity module server to provide the logical address of the first subscriber identity module of the first number of subscriber identity modules received at the first subscriber identity module bank in response to a second request corresponding to the first set of subscriber identity information received by the second subscriber identity module server.

3. A method of remotely associating wireless communications clients with subscriber identities, comprising:
receiving a first request from a wireless communications client;
determining whether the received first request includes a respective sufficient indication of authorization; and
automatically providing a first set of subscriber identity information from a first subscriber identity module corresponding to the first request to the requesting wireless communications client over a respective communications path if the received first request includes the respective sufficient indication of authorization where the first subscriber identity module is physically present at a subscriber identity module bank and the wireless communications client is remote from the first subscriber identity module, and denying access to the first set of subscriber identity information from the first subscriber identity module to the requesting wireless communications client if the received first request does not include the respective sufficient indication of authorization;
receiving a second recluest from the wireless communications client;
determining whether the received second recluest includes a respective sufficient indication of authorization; and
automatically providing a second set of subscriber identity information from a second subscriber identity module corresponding to the second recluest to the requesting wireless communications client over a respective communications path if the received second request includes the respective sufficient indication of authorization where the second subscriber identity module is physically present at the subscriber identity module bank and the wireless communications client is remote from the second subscriber identity module, and denying access to the second set of subscriber identity information from the second subscriber identity module to the requesting wireless communications client if the received second request does not include the sufficient indication of authorization.

4. A method to remotely operate wireless telecommunications devices, comprising:
receiving a request for at least one of a number of subscriber identity modules physically located at a subscriber identity module bank that is remotely located from the wireless communications devices;
after receiving the request, determining the requested one of the subscriber identity modules corresponding to the request; and
responding to the request by providing a unique set of subscriber identity information based at least in part on an irretrievable and un-modifiable subscriber identifier encoded in the requested one of the subscriber identity modules physically located at the subscriber identity module bank remotely located from the wireless telecommunications devices over a communications link different from a cellular communications link used by the wireless telecommunications devices for cellular communications with a destination device, wherein the wireless telecommunications devices include a mobile phone having a subscriber identification module interface, and wherein providing a unique set of subscriber identity information from the requested one of the subscriber identity modules includes providing a unique set of subscriber identity information to the subscriber identification interface of the mobile phone via at least one universal asynchronous receiver/transmitter that is remote from the mobile phone.

5. A method to remotely operate wireless telecommunications devices, comprising:
receiving a request for at least one of a number of subscriber identity modules physically located at a subscriber identity module bank that is remotely located from the wireless communications devices;
after receiving the request, determining the requested one of the subscriber identity modules corresponding to the request; and
responding to the request by providing a unique set of subscriber identity information based at least in part on an irretrievable and un-modifiable subscriber identifier encoded in the requested one of the subscriber identity modules physically located at the subscriber identity module bank remotely located from the wireless telecommunications devices over a communications link different from a cellular communications link used by the wireless telecommunications devices for cellular communications with a destination device, wherein the wireless telecommunications devices include a personal digital assistant having a subscriber identification module interface, and wherein providing a unique set of subscriber identity information from the requested one of the subscriber identity modules includes providing a unique set of subscriber identity information to the subscriber identification interface of the personal digital assistant via at least one universal asynchronous receiver/transmitter that is remote from the personal digital assistant.

6. A method to remotely operate wireless telecommunications devices, comprising:
receiving a request for at least one of a number of subscriber identity modules physically located at a subscriber identity module bank that is remotely located from the wireless communications devices;
after receiving the request, determining the requested one of the subscriber identity modules corresponding to the request;
responding to the request by providing a unique set of subscriber identity information based at least in part on an irretrievable and un-modifiable subscriber identifier encoded in the requested one of the subscriber identity modules physically located at the subscriber identity module bank remotely located from the wireless telecommunications devices over a communications link different from a cellular communications link used by the wireless telecommunications devices for cellular communications with a destination device; and
transmitting subscriber identification module usage information corresponding to usage of the request one of the subscriber identity modules to an accounting system.

7. A method to remotely operate wireless telecommunications devices, comprising:

receiving a first request for at least one of a number of subscriber identity modules remotely located from the wireless communications devices;

responding to the first request by providing a first unique set of subscriber identity information based at least in part on an irretrievable and un-modifiable subscriber identifier encoded in the requested one of the subscriber identity modules remotely located from the wireless communications devices over a communications link different from a cellular communications link used by the wireless communications devices for cellular communications with a destination device;

receiving a second request for at least one of a number of subscriber identity modules;

after receiving the second request, determining the requested second one of the subscriber identity modules corresponding to the second request; and responding to the second request by providing a second unique set of subscriber identity information based at least in part on an irretrievable and un-modifiable subscriber identifier encoded in the requested second one of the subscriber identity modules to a first wireless telecommunications device of a first remote wireless communications client over a communications link different from the cellular communications link used by the wireless communications devices for cellular communications with a destination device.

8. A method to remotely operate wireless telecommunications device, comprising:

at a first subscriber identity module server associated with a first subscriber identity module bank having a respective number of subscriber identity module receiving positions discretely and remotely located from the wireless telecommunications device and responsive to requests to provide subscriber identity information from a first number of subscriber identity modules physically received at a respective first number of subscriber identity module receiving positions of the associated first subscriber identity module bank, receiving a first request for subscriber identity information from at least one of a number of subscriber identity modules remotely located from the wireless communications device;

providing address information for retrieving the requested subscriber identity information in response to the first request received at the first subscriber identity module server;

at a second subscriber identity module server associated with a second subscriber identity module bank having a respective number of subscriber identity module receiving positions discretely and remotely located from the wireless telecommunications device and responsive to requests to provide subscriber identity information from a second number of subscriber identity modules physically received at a respective second number of subscriber identity module receiving positions of the associated second subscriber identity module bank, receiving a second request for subscriber identity information from at least one of a number of subscriber identity modules remotely located from the wireless communications device; and providing the subscriber identity information from a respective subscriber identity module physically present at the second subscriber identity module bank to the wireless communications device over a respective first communications path different from a second communications path used by the wireless communications device for communications with a destination device in response to the second request for subscriber identity information received at the second subscriber identity module server.

9. The method of claim 8 wherein receiving a first request further includes receiving the first request from a controller physically remote from the wireless telecommunications device.

10. The method of claim 8 wherein receiving a first request further includes receiving the first request from the wireless telecommunications device.

* * * * *